US012798263B2

(12) United States Patent
Yoshihara et al.

(10) Patent No.: US 12,798,263 B2
(45) Date of Patent: Nov. 17, 2026

(54) IMAGE RECORDING APPARATUS

(71) Applicants: Mayumi Yoshihara, Kanagawa (JP); Hisashi Habashi, Kanagawa (JP)

(72) Inventors: Mayumi Yoshihara, Kanagawa (JP); Hisashi Habashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 18/963,853

(22) Filed: Nov. 29, 2024

(65) Prior Publication Data

US 2025/0178360 A1 Jun. 5, 2025

(30) Foreign Application Priority Data

Nov. 30, 2023 (JP) ................................ 2023-202593
Jun. 19, 2024 (JP) ................................ 2024-098749

(51) Int. Cl.
*B41J 11/00* (2006.01)
*B41J 29/377* (2006.01)
*C09D 11/30* (2014.01)

(52) U.S. Cl.
CPC ......... *B41J 11/0015* (2013.01); *B41J 29/377* (2013.01); *C09D 11/30* (2013.01)

(58) Field of Classification Search
CPC .... B41J 2/01; B41J 11/0015; B41J 11/00214; B41J 29/377; C09D 11/30
See application file for complete search history.

(56) References Cited

U.S. PATENT DOCUMENTS

2014/0160197 A1 6/2014 Hirose et al.
2017/0173976 A1* 6/2017 Matsuura ............ B41J 11/0015
2018/0126751 A1* 5/2018 Nakai ........................ B41J 2/07
2019/0185690 A1 6/2019 Umemura et al.
2019/0249020 A1 8/2019 Matsuyama et al.
2022/0363063 A1 11/2022 Masuda et al.
2022/0363927 A1 11/2022 Takahashi et al.
2023/0183501 A1 6/2023 Hasegawa et al.
2024/0117206 A1 4/2024 Yoshihara et al.

FOREIGN PATENT DOCUMENTS

JP 2004-235658 A 8/2004
JP 2008-207534 A 9/2008
JP 2009-234887 A 10/2009
JP 2014-005179 A 1/2014
JP 2018-138384 A 9/2018
WO 2019/245002 A1 12/2019

OTHER PUBLICATIONS

Yoshihiro Harada, "Measurement of Viscosity Increasing Process of Ink Droplets after Landing on Media", Nihon Gazo Gakkaishi (Journal of the Imaging Society of Japan) vol. 59 No. 5 (2020) pp. 480-486.

* cited by examiner

*Primary Examiner* — Anh T Vo
(74) *Attorney, Agent, or Firm* — Grüneberg Global IP, PLLC

(57) ABSTRACT

An image recording apparatus is provided that includes a recording medium chemical surface treatment device and an image forming material applying device. The recording medium chemical surface treatment device includes a chlorine dioxide supplying unit that supplies chlorine dioxide to a recording medium and a light irradiating unit that emits light to the recording medium. The image forming material applying device applies an image forming material to the recording medium subjected to chemical surface treatment by the recording medium chemical surface treatment device.

8 Claims, 18 Drawing Sheets

| | AFTER CHEMICAL SURFACE TREATMENT | BEFORE CHEMICAL SURFACE TREATMENT |
|---|---|---|
| TEST IMAGE 1 |  |  |
| TEST IMAGE 2 | Sample Text - 6 point | Sample Text - 6 point |

IMAGE RECORDING APPARATUS

CROSS-REFERENCE TO RELATED APPLICATIONS

This patent application is based on and claims priority pursuant to 35 U.S.C. § 119 (a) to Japanese Patent Application Nos. 2023-202593 and 2024-098749, filed on Nov. 30, 2023 and Jun. 19, 2024, respectively, in the Japan Patent Office, the entire disclosure of each of which is hereby incorporated by reference herein.

BACKGROUND

Technical Field

The present disclosure relates to an image recording apparatus.

Related Art

An image recording apparatus may include, in addition to an image recording device, a recording medium surface treatment device that physically or chemically treats and modifies the surface of a recording medium to make the recording medium suitable for image recording.

An image forming material applying device and a recording medium treatment device may be implemented by separate devices, or may be implemented continuously in one device.

SUMMARY

Embodiments of the present invention provide an image recording apparatus including a recording medium chemical surface treatment device and an image forming material applying device. The recording medium chemical surface treatment device includes a chlorine dioxide supplying unit that supplies chlorine dioxide to a recording medium and a light irradiating unit that emits light to the recording medium. The image forming material applying device applies an image forming material to the recording medium subjected to chemical surface treatment by the recording medium chemical surface treatment device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
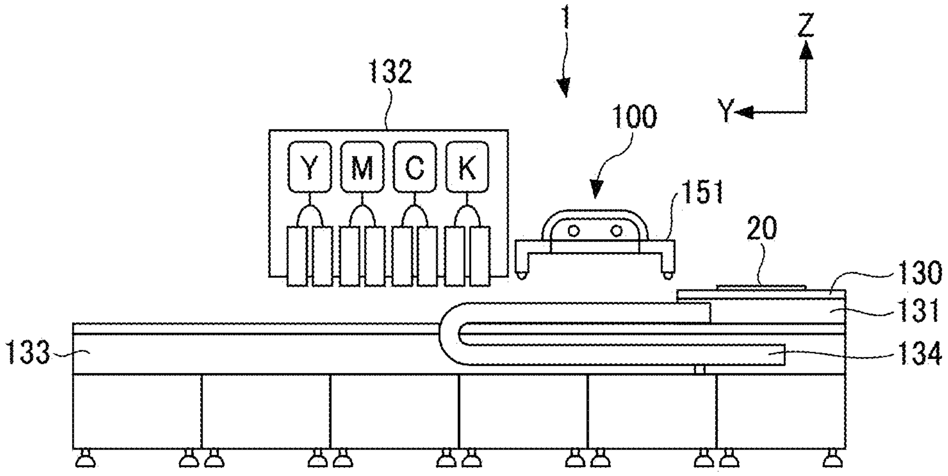
FIGS. 1A to 1C are schematic diagrams illustrating an image recording apparatus according to one embodiment of the present invention, viewed from the side, the front, and the top, respectively.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the surface treatment of a recording medium, it is desirable to consider not only the recording medium, but also matching with the image forming material, including physical properties.

For example, an image forming material used in an inkjet method has low viscosity, and thus, problems due to the fluidity of the ink tend to occur when the ink is applied and fixed to the recording medium.

If the recording medium being used is a recording medium having low liquid absorption, inter-color bleeding due to the color bleeding phenomenon when ink droplets mix, and spots caused by the beading phenomenon due to droplet fusion, may occur. In addition, if the affinity of the recording medium with ink is low, the dot diameter of the ink does not expand well, and an excessive amount of ink droplets is likely to be required.

On the other hand, if the recording medium being used is a liquid-absorbent recording medium, the unevenness of the recording medium can cause the ink droplets to spread irregularly, so that the ink droplets permeate excessively or form whisker-like bleeding shapes due to capillary forces along the fiber composition.

For example, techniques for treating the surface of a recording medium include providing a coating layer that has a high affinity with ink to obtain a recording medium having surface properties suitable for the ink, applying a compound that reacts with the ink, and performing a plasma treatment to improve the affinity with the ink.

However, by providing a coating layer having high affinity with the ink, the texture and the gloss of the recording medium change. Therefore, the characteristics of the recording medium significantly change, so that it may not be possible to use the recording medium as a versatile recording medium dedicated to the recording method, and coating costs are also likely to increase.

Further, if a compound is applied that reacts with the ink, the chemical properties and the hardness of the recording medium may be affected. Thus, toxic chemical substances may remain in the recording medium, or printing using different recording methods may be affected due to re-dissolution of the applied material. As described above, a method of applying a compound that reacts with the ink may affect the printing process and the safety and versatility of the recording medium.

Further, when a plasma treatment is performed to improve the affinity of the recording medium with the ink, the surface of the recording medium can be physically modified. However, this process only modifies the outermost surface, and the extent of modification depends on the amount of energy applied. Therefore, in a general environment, there is a limit to the extent of modification, and the recording media and the target ink exhibiting the effect are limited.

For the reasons mentioned above, it is desirable to subject the recording medium to a surface treatment taking into consideration not only the recording medium, but also matching with the image forming material. Therefore, it is not easy to obtain, as an image recording apparatus including an image forming material applying device and a recording medium surface treatment device, an image recording apparatus that is suitable for good image recording, regardless of the type of the recording medium.

According to embodiments of the present invention, an image recording apparatus is provided that forms a good image regardless of the type of recording medium.

Embodiments of the present embodiment will be described in detail below. Note that the embodiments described below are preferred embodiments of the present invention. However, the scope of the present invention is not intended to be unduly limited by the following description.

(Image Recording Apparatus)

An image recording apparatus of the present embodiment includes: a recording medium chemical surface treatment device including a chlorine dioxide supplying unit that supplies chlorine dioxide to a recording medium and a light irradiating unit that emits light to the recording medium, and an image forming material applying device that applies an image forming material to the recording medium subjected to chemical surface treatment by the recording medium chemical surface treatment device.

According to the present embodiment, an image recording apparatus is provided that forms a good image regardless of the type of recording medium.

The image recording apparatus of the present embodiment may also include other devices.

<Recording Medium Chemical Surface Treatment Device>

The recording medium chemical surface treatment device includes a chlorine dioxide supplying unit that supplies chlorine dioxide, and a light irradiating unit that emits light.

The recording medium chemical surface treatment device preferably includes a shielding mechanism to block external air, so that the recording medium can be subjected to chemical surface treatment in an enclosed space filled with a high concentration of chlorine dioxide.

The recording medium chemical surface treatment device preferably includes an exhaust mechanism to exhaust the supplied chlorine dioxide. By exhausting the supplied chlorine dioxide, reacted gas is removed and unreacted chlorine dioxide is supplied to the recording medium. Thus, it is possible to continuously subject the surface of the recording medium to chemical surface treatment.

<<Chemical Surface Treatment>>

Herein, "chemical surface treatment" refers to a treatment in which chlorine dioxide supplied to the surface of a recording medium is irradiated with light to cause a chemical reaction that oxidizes the surface of the recording medium. Thereby, the number of hydrophilic functional groups on the surface of the recording medium is increased and the recording medium is modified to have a more hydrophilic surface.

Molecules of chlorine dioxide include radicals. Thus, it is assumed that, when chlorine dioxide absorbs light energy $h\nu$ (h referring to the Planck's constant, $\nu$ referring to the frequency of light), chlorine dioxide decomposes to generate chlorine radicals and oxygen molecules.

The radicals of chlorine dioxide and the chlorine radicals generated by photolysis strike the surface of the recording medium, causing an oxidizing chemical reaction. When the recording medium is an organic material, these radicals strike the hydrocarbon groups on the surface of the organic material, causing an oxidation reaction.

Even without being exposed to light, chlorine dioxide has radicals and thus, is reactive. However, these radicals are weak and unlikely to modify the recording medium. Therefore, the modification is promoted by irradiating chlorine dioxide with light to generate chlorine radicals.

For example, when the recording medium is an organic material, in the recording medium after chemical surface treatment, the surface of the recording medium is in an oxidized state, and the number of carboxyl groups increases compared to a state before the treatment.

Thus, the surface properties of the recording medium become hydrophilic and the surface pH decreases. By controlling these properties, it is possible to control wet-spreading and adhesion of the image forming material to the surface of the recording medium.

The temperature in the chemical surface treatment of the recording medium is not particularly limited, but is preferably from −20° C. to 100° C., and more preferably from 0° C. to 60° C.

The ambient pressure during the reaction is not particularly limited, but the reaction may be performed at 0.1 MPa to 100 MPa, for example. Therefore, it is possible to subject the recording medium to a chemical surface treatment at atmospheric pressure and at a temperature from 5° C. to 35° C., without applying heat, increasing the pressure, or reducing the pressure.

According to the present embodiment, it is possible to subject a recording medium to a chemical surface treatment at atmospheric pressure and at a temperature from 5° C. to 35° C., and thus, it is possible to form an image on the recording medium without affecting the properties of the recording medium, even if the recording medium contains a polymer having low heat resistance.

<<Shielding Mechanism Blocking External Air>>

Examples of the shielding mechanism blocking external air include, but are not limited to, reaction chamber members, nip members, rollers, and irradiation windows.

The reaction chamber member contacts the chlorine dioxide gas, and thus, preferably contains a metal that does not easily rust.

The metal that does not easily rust is preferably stainless steel, more preferably austenitic stainless steel resistant to corrosion, and particularly preferably SUS304L, SUS316, SUS312L, SUS321, and SUS347.

Further, the reaction chamber member contacts the chlorine dioxide gas having high concentration, so that corrosion may be prevented by providing a protective film on the surface of the part contacting the chlorine dioxide gas.

The protective film is preferably a non-metallic coating film, and a glass lining or a ceramic coating is more preferable to obtain excellent durability, acid resistance, and heat resistance.

A resin coating may be used as the protective film, and in this case, a fluororesin coating is preferred. Examples of the coating include, but are not limited to, a coating obtained by a surface treatment including compressing and heating a powder of polytetrafluoroethylene, and a coating obtained by a process of depositing fluororesin particles by electroless plating to form a coating film serving as a protective film.

It is preferable to use a deformable elastic member such as rubber as the nip member, because such a deformable elastic member deforms and adheres to a chamber and a processing table to fill a gap between the chamber and the processing table. Thus, gas can be prevented from leaking from the reaction chamber to the outside. The rubber is preferably a rubber that does not easily react with gas containing chlorine dioxide, and it is preferable to use a fluorine-based rubber and a silicone rubber, for example.

It is preferable to use a deformable elastic member such as rubber as the roller, because such a deformable elastic member deforms and adheres to the chamber and the processing table to fill a gap between the chamber and the processing table. Thus, gas can be prevented from leaking from the reaction chamber to the outside. The rubber is preferably a rubber that does not easily react with gas containing chlorine dioxide, and it is preferable to use a fluorine-based rubber and a silicone rubber, for example.

The roller may be coated with a non-metallic coating film or a resin coating to reduce the corrosive effect of chlorine dioxide.

The irradiation window is preferably transparent and has low light absorption. Moreover, it is preferable that the irradiation window is formed of a chemically stable material that does not contain polyvalent metals as impurities, and suitable examples thereof include, but are not limited to, quartz glass and borosilicate glass.

<<Exhaust Mechanism>>

Examples of the exhaust mechanism include, but are not limited to, an exhaust pipe, an exhaust valve, an exhaust pump, and an exhaust gas control valve. However, any other device that can function as the exhaust mechanism may be used, as long as the device does not impede the object of the present embodiment.

The exhaust mechanism preferably includes a chlorine dioxide-derived compound adsorption mechanism that adsorbs the above-mentioned compounds derived from chlorine dioxide, to adsorb and remove toxic gas components such as unreacted chlorine dioxide gas and acidic gases such as chlorine gas remaining after the reaction in the exhaust gas.

In the exhaust mechanism, a member that contacts the chlorine dioxide gas preferably contains a metal that does not easily rust.

The metal that does not easily rust is preferably stainless steel, more preferably austenitic stainless steel resistant to corrosion, and particularly preferably SUS304L, SUS316, SUS312L, SUS321, and SUS347.

Further, the member contacts the chlorine dioxide gas having high concentration, so that corrosion may be prevented by providing a protective film on the surface of the member contacting the chlorine dioxide gas.

The protective film is preferably a non-metallic coating film, and a glass lining or a ceramic coating is more preferable to obtain excellent durability, acid resistance, and heat resistance.

A resin coating may be used as the protective film, and in this case, a fluororesin coating is preferred. Examples of the coating include, but are not limited to, a coating obtained by a surface treatment including compressing and heating a powder of polytetrafluoroethylene, and a coating obtained by a process of depositing fluororesin particles by electroless plating to form a coating film serving as a protective film.

Further, resin materials can be used at a location where heat is not applied. From the viewpoint of cost and flexibility, vinyl chloride is preferably contained in an exhaust pipe, an exhaust gas adsorption filter housing, and the like, which contact the chlorine dioxide gas having high concentration and thus are desirably formed of materials having high oxidation resistance.

The chemical surface treatment of the recording medium according to the present embodiment may be implemented by using chlorine dioxide and light, as described below.

<<<<Chlorine Dioxide-Derived Compound Adsorption Mechanism>>>

The exhaust mechanism preferably includes a mechanism for collecting and treating exhausted or leaked compounds derived from chlorine dioxide. For example, it is preferable that the compounds derived from chlorine dioxide are adsorbed by a chlorine dioxide-derived compound adsorption mechanism.

The chlorine dioxide-derived compound adsorption mechanism is not particularly limited, as long as the mechanism does not impede the object of the present invention. Examples thereof include, but are not limited to, an exhaust gas adsorption filter and a wet scrubber. An example of a specific method includes using alkaline water or water that adsorbs compounds in a column filled with activated carbon, hydrotalcite, or the like, to adsorb, neutralize, and remove the compounds. Another example of a method includes spraying an aqueous solution of 1 mass % DMSO onto exhausted or leaked gas, and separating and collecting the aerosol to adsorb and remove acidic components in the gas.

<<Chlorine Dioxide Supplying Unit>>

The chlorine dioxide supplying unit includes a chlorine dioxide gas source.

The chlorine dioxide supplying unit supplies chlorine dioxide to the surface of a recording medium, and the chlorine dioxide may be supplied as a gas or a liquid such as a solution.

The substance supplied by the chlorine dioxide supplying unit may be a gas or a liquid containing chlorine dioxide. The supplied chlorine dioxide, or the gas or the liquid containing chlorine dioxide, contacts the surface of the recording medium.

A method of supplying chlorine dioxide is not particularly limited. Examples thereof include a method in which chlorine dioxide is supplied by dissolving a substance that generates chlorine dioxide, such as chlorous acid or a salt thereof, in water and allowing the solution to stand, or by further adding hydrochloric acid thereto and allowing the solution to stand, so that chlorine dioxide radicals are naturally generated from chlorite ions.

Chlorine dioxide may be supplied by using a gas cylinder or a generator, and the method of supplying chlorine dioxide is not limited to the above-described method.

In the chemical surface treatment, the gas containing chlorine dioxide supplied to the recording medium may be mixed with air in the atmosphere, without replacing the reaction atmosphere with an inert gas or the like. In the chemical surface treatment of the recording medium, any substance may be mixed with chlorine dioxide, as long as the gas does not react with chlorine dioxide to cause an explosion during the chemical surface treatment.

Therefore, in the present embodiment, a step of subjecting the recording medium to a chemical surface treatment by using the recording medium chemical surface treatment device can be implemented in the atmosphere, and all other steps, including a step of applying an image forming material to the recording medium, can also be implemented in the atmosphere.

In addition to the chlorine dioxide gas source, the chlorine dioxide supplying unit may include, for example, a chlorine dioxide gas valve, a chlorine dioxide gas pipe, an air pipe, an air valve, a pressure gauge, a chlorine dioxide concentration adjustment chamber, a chlorine dioxide concentration meter, a supply gas adjustment valve, and other components that can be used to supply chlorine dioxide.

In the chlorine dioxide supplying unit, the members contacting the chlorine dioxide gas are preferably members that do not easily rust, and examples thereof are similar to those described above for the exhaust mechanism.

It is preferable to remove compounds derived from chlorine dioxide leaking from the chlorine dioxide supplying unit, and thus, it is preferable to provide the chlorine dioxide-derived compound adsorption mechanism.

—Chlorine Dioxide Gas Source—

Examples of the chlorine dioxide gas source include, but are not limited to, a gas cylinder or a gas generator, and a method of generating chlorine dioxide is not particularly limited.

The gas generator may be manufactured in accordance with a mechanism for generating chlorine dioxide gas.

The method of generating chlorine dioxide gas is not limited. Examples of an apparatus that can be used to generate chlorine dioxide include, but are not limited to, a commercially available apparatus that generates chlorine dioxide gas by reacting 25% sodium chlorite with 9% hydrochloric acid, an apparatus that supplies chlorine dioxide gas generated by adding sodium chlorite powder to an acidic solution as disclosed in Japanese Patent No. 5449691, an apparatus that supplies chlorine dioxide gas generated by adding pellet-shaped sodium chlorite to an acidic solution as disclosed in Japanese Patent No. 5944760, and an apparatus that supplies chlorine dioxide generated by using a method of generating chlorine dioxide from a sodium chlorite aqueous solution acidified by hydrochloric acid as disclosed in Japanese Patent No. 7117793.

Specifically, for example, 10 parts by mass of sodium chlorite (manufactured by KANTO CHEMICAL CO., INC.) and 500 parts by mass of highly pure water are placed in a glass container. After dissolving the sodium chlorite in the highly pure water, 5.3 parts by mass of an aqueous hydrochloric acid solution (manufactured by Kishida Chemical Co., Ltd.) having a concentration of 35 to 37 mass % is added to prepare a mixed solution. The mixed solution is left to stand for 24 hours. After 24 hours, the UV spectrum of the mixed solution is measured by using a spectrophotometer to confirm that absorption by chlorine dioxide can be observed in the vicinity of 350 to 360 nm, and chlorine dioxide generated from such a mixed solution can be used.

The concentration of the chlorine dioxide gas being supplied is not limited. However, it is preferable to supply a chlorine dioxide gas having a chlorine dioxide concentration higher than the upper control limit of the gas concentration, in accordance with the treatment contents.

A chlorine dioxide gas may be utilized in which chlorine dioxide is mixed with an inert gas such as nitrogen gas and argon gas, or a gas containing active species such as air and oxygen gas. In particular, air and oxygen gas serve as a supply source of oxygen for oxidizing the surface in the chemical surface treatment. Further, in a case where chlorine dioxide is mixed with air, it is not necessary to provide an air supply source, and thus, the device can be simplified, which is preferable.

A chlorine dioxide concentration adjustment chamber may be provided between the chlorine dioxide gas source and the reaction chamber where the chemical surface treatment is performed. Depending on the chlorine dioxide gas concentration, other gases can be added to adjust the concentration of chlorine dioxide to a concentration appropriate for being supply to the reaction system. The gas used in the adjustment is not limited to air, oxygen, and the like, and a gas containing a component that can adjust the reaction after mixing the gas with chlorine dioxide gas may be used. It is preferable to adjust the concentration or the pressure of the gas to be supplied for use in the chemical reaction. Further, it is preferable to adjust the temperature, the humidity, and the concentration of other gas components.

<<Light Irradiating Unit>>

The light irradiating unit includes a light source, and the chlorine dioxide supplied to the surface of the recording medium is irradiated with light from the light irradiating unit.

The peak wavelength of the light emitted at this time is preferably from 200 nm to 800 nm, and more preferably from 270 nm to 470 nm. From the viewpoint of activating the photolysis, the wavelength is more preferably from 300 nm to 400 nm, which is close to the maximum absorption wavelength of 360 nm of the chlorine dioxide radical.

As the light, natural light such as sunlight, ultraviolet light, and the like can be used. The light source of the emitted light is not particularly limited. When ultraviolet light is used, a light source such as a xenon lamp, a halogen lamp, a fluorescent lamp, a mercury lamp, a high-pressure mercury lamp, a metal halide lamp, and an LED may be appropriately used.

In addition to the components described above, the light irradiating unit may include any component that can be used to emit light, such as a light source cooling pipe, a water cooling circulator, a light diffusion plate, and a light guide plate.

The light source easily generates heat, and thus, it is preferable to cool the light source by water cooling or the like.

When water cooling is performed, the light source and the water cooling circulator may be connected to a light source cooling pipe, and the light source may be cooled by circulating cooling water. By cooling the light source as described above, it is possible to efficiently remove the heat from the light source.

In addition, when using an LED, a water-cooled LED, in which the cooling efficiency is high, can be used to prevent integrated LED light-emitting elements from generating heat. Thus, it is possible to prevent the service life of the elements from decreasing and facilitate an increase of the integration degree.

To reduce reaction activity in the chemical surface treatment and to avoid unnecessary overheating of the recording medium, a filter or the like may be used in the light source to cut out wavelengths other than the desired wavelengths. As the amount of infrared light exceeding 800 nm contained in the emitted light increases, the temperature of the recording medium and the reaction system rises in accordance with the irradiation conditions of the light source. Therefore, from the viewpoint of stably controlling the reaction and preventing deformation of the recording medium, it is preferable to cut the long wavelength components of the light.

To achieve good energy efficiency and low heat generation, minimize the temperature effect inside the reaction chamber, and ensure low power consumption by the limitation of emission wavelengths, the light source for emitting light is preferably a UV-LED light source, which is an LED light source of ultraviolet light.

In a case of using a UV-LED light source, even if the light source is a UV-LED array light source in which a plurality of UV-LEDs are arranged, the light source generates little heat. Therefore, the size of the apparatus can be reduced and the image recording apparatus of the present embodiment may have a configuration by which it is possible to save power.

Commercially available UV-LED arrays are available from Phoseon Technology, Heraeus Group, Ushio Inc., Hamamatsu Photonics K.K., and the like. For example, UV-LED array light sources having peak wavelengths of 365 nm, 385 nm, 395 nm, and 405 nm are available.

A light diffusion plate may be provided between the light source and the recording medium.

If the recording medium does not move while being irradiated with light, the irradiation position is fixed, and thus, the uniformity of the light source is likely to be expressed as a difference in the uniformity of the chemical surface treatment. However, by irradiating the recording medium with light via a light diffusion plate, the straightness of the light can be reduced, and thus, it is possible to uniformly irradiate the recording medium.

When an LED light source is used, the straightness of the light emitted by the light emitting elements is very high, and thus, it is preferable to provide a light diffusion plate between the LED light source and the recording medium.

Moreover, a light guide plate may be provided near the light source to control the irradiation direction of the light by the light guide plate.

The light irradiation time is not limited. However, the purpose is to modify the surface of the recording medium into a surface state suitable for image formation. Therefore, the desired time varies depending on the recording medium or the image forming material. Further, the amount of generated chlorine radicals may vary depending on the amount of chlorine dioxide, the wavelength of the emitted light, the light intensity, and the like, and the conditions when modifying the surface of the recording medium may vary depending on the amount of radicals. Therefore, the light irradiation time may be controlled to any length of time. From the viewpoint of increasing the image formation speed, it is preferable to perform irradiation during 1 second or more and 600 seconds or less, and more preferably during 1 second or more and 60 seconds or less.

<<Other Members>>

The recording medium chemical surface treatment device may include other members, and examples thereof include various types of sensors and bearings.

Examples of the sensors include a temperature sensor, a pressure sensor, a humidity sensor, a chlorine dioxide sensor, an oxygen sensor, an air flow meter, and an air speedometer.

Examples of materials contained in the bearings include, but are not limited to, stainless steel, ceramics, and fluororesin.

Similarly to the protective film provided on the metal surface described above, a non-metallic film or a resin coating may be used on the surface of the bearing to reduce the corrosive effect of chlorine dioxide.

<Recording Medium>

The recording medium is not particularly limited, as long as the recording medium does not contradict the object of the present invention. However, in the recording medium, it is preferable that the surface onto which the image forming material is applied has poor liquid absorption.

Herein, "poor liquid absorption" refers to a property in which the amount of pure water transferred to the recording medium is 9 $ml/m^2$ or less during a contact time of 40 ms, and the amount of pure water transferred to the recording medium is 29 $ml/m^2$ or less during a contact time of 400 ms, measured by using a dynamic scanning absorptiometer.

In a case where the surface of the recording medium onto which the image forming material is applied has poor liquid absorption, even if a liquid image forming material such as a solvent-based ink, an ultraviolet-curable ink, and a water-based ink is used, excessive permeation, bleeding, or irregular spreading of ink droplets is unlikely to occur, and thus, it is easier to form a good image.

Examples of the recording medium that can be used include, but are not limited to, plain paper, high-quality paper, recycled paper, thin paper, thick paper, coated paper, synthetic resin films such as polypropylene film, polyethylene terephthalate film, and polyvinyl chloride film, thin metal films, fabrics, and other media having a surface on which images can be formed with ink or the like. In particular, based on the absorption characteristics measured by the dynamic scanning absorptiometer, existing printing recording media such as plastic films including polyvinyl chloride film, polyethylene terephthalate film, polypropylene film, polyethylene film, polycarbonate film, polyimide film, polystyrene film, and nylon film, laminated paper having a surface formed of a non-porous material, coated paper, and tarpaulin can be suitably used.

Examples of a recording medium having a surface with poor liquid absorption onto which an image forming material is applied include, but are not limited to, synthetic resin films such as polypropylene film (hereinafter referred to as PP film), polyethylene terephthalate film (hereinafter referred to as PET film), and polyvinyl chloride film, coated paper, thin metal films, and tarpaulin obtained by coating a fabric with a resin. In particular, based on the absorption characteristics measured by the dynamic scanning absorptiometer, existing printing recording media such as plastic films including polyvinyl chloride film, polyethylene terephthalate film (PET film), polypropylene film (PP film), polyethylene film, polycarbonate film, polyimide film, polystyrene film, and nylon film, laminated paper having a surface formed of a non-porous material, coated paper, and tarpaulin can be suitably used.

Examples of commercially available products used as the polyvinyl chloride film include, but are not limited to, IJ180 manufactured by 3M Japan Co., Ltd. and GIY-11Z5 GLOSS manufactured by Lintec Sign System, Inc.

Examples of commercially available products used as the polypropylene film (PP film) include, but are not limited to, PYLEN films P1011, P-2002, P-2161, and P-4166 manufactured by Toyobo Co., Ltd., PA-20, PA-30, and PA-20W manufactured by Sun Tox Corporation, and FOA, FOS, and FOR manufactured by Futamura Chemical Co., Ltd.

Examples of the polyethylene terephthalate film (PET film) include E-5100 and E-5102 manufactured by Toyobo Co., Ltd., LUMIRROR #50-T60, P60, and P375 manufactured by Toray Industries, Inc., and G2, G2P2, K, and SL manufactured by Teijin DuPont Films.

Examples of the nylon film include, but are not limited to, HARDEN FILM N-1100, N-1102, and N-1200 manufactured by Toyobo Co., Ltd., and ON, NX, MS, and NK manufactured by Unitika Ltd.

Examples of the coated paper include, but are not limited to, OK TOP COAT+(PLUS), OK TOP COAT GLOSS+, OK TOP COAT S, OK CASABLANCA, OK CASABLANCA V, OK TRINITY, OK TRINITY NaVi, NEW AGE, NEW AGE W, OK TOP COAT MATTE N, OK ROYAL COAT, OK TOP COAT DULL, Z COAT, OK TAKAHIME, OK TAKAO, OK TAKAO SATIN, OK TOP COAT+, OK NON-WRINKLE, OK COAT V, OK COAT N GREEN 100, OK MATTE COAT GREEN 100, NEW AGE GREEN 100, and Z COAT GREEN 100 manufactured by Oji Paper Co., Ltd., AURORA COAT, SHIRAOI MATTE, IMPERIAL MATTE, SILVER DIA, RECYCLE COAT 100, and RECYCLE MATTE 100 manufactured by Nippon Paper Industries Co., Ltd., MU COAT, MU WHITE, MU MATTE, and WHITE MU MATTE manufactured by Hokuetsu Paper Mills, Ltd., RAICHO COAT N, REGINA RAICHO COAT 100, RAICHO MATTE COAT N, and REGINA RAICHO MATTE 100 manufactured by Chuetsu Pulp & Paper Co., Ltd., PEARL COAT, WHITE PEARL COAT N, NEW V MATTE, WHITE NEW V MATTE, PEARL COAT REW, WHITE PEARL COAT NREW, NEW V MATTE REW, and WHITE NEW V MATTE REW manufactured by Mitsubishi Paper Mills Limited, OK COAT L, ROYAL COAT L, OK COAT LR, OK WHITE L, OK ROYAL COAT LR, OK COAT L GREEN 100, and OK MATTE COAT L GREEN 100 manufactured by Oji Paper Co., Ltd., EASTER DX, RECYCLE COAT L100, AURORA L, RECYCLE MATTE L100, and <SSS> ENERGY WHITE manufactured by Nippon Paper Industries Co., Ltd., UTRILLO COAT L and MATIS COAT manufactured by Daio Paper Corporation, Hi-ALPHA, ALPHA MATTE, (N) KINMARI L, and KINMARI HiL manufactured by Hokuetsu Paper Mills, Ltd., N PEARL COAT L, N PEARL COAT LREW, and SWING MATTE REW manufactured by Mitsubishi Paper Mills Limited, SUPER EMINE, EMINE, and CHATON manufactured by Chuetsu Pulp & Paper Co., Ltd., OK Medium-Quality Coat, (F) MCOP, OK ASTRO GLOSS, OK ASTRO DULL, and OK ASTRO MATTE manufactured by Oji Paper Co., Ltd., KING O manufactured by Nippon Paper Industries Co., Ltd., OK ROYAL LIGHT S GREEN 100, OK EVERLIGHT COAT, OK EVERLIGHT R, OK EVERGREEN, CLEAN HIT MG, OK Micro Coating SUPER ECO G, ECO GREEN DULL, OK Micro Coating MATTE ECO G100, OK STARLIGHT COAT, OK SOFT ROYAL, OK BRIGHT, CLEAN HIT G, YAMAYURI BRIGHT, YAMAYURI BRIGHT G, OK AQUA LIGHT COAT, OK ROYAL LIGHT S GREEN 100, OK BRIGHT (Rough/Glossy), SNOW MATTE, SNOW MATTE DX, OK TAKAHIME, and OK TAKAYURI manufactured by Oji Paper Co., Ltd., PYRENE DX, PEGASUS HYPER 8, AURORA S, ANDES DX, SUPER ANDES DX, SPACE DX, SEINE DX, TOKU GRAVURE DX, PEGASUS, SILVER PEGASUS, PEGASUS HARMONY, GREENLAND DX100, SUPER GREENLAND DX100, <SSS> ENERGY SOFT, <SSS> ENERGY LIGHT, and EE HENRY manufactured by Nippon Paper Industries Co., Ltd., KANT EXCEL, EXCEL SUPER B, EXCEL SUPER C, KANT EXCELBAL, UTRILLO EXCEL, HEYNE EXCEL, and DANTE EXCEL manufactured by Daio Paper Corporation, COSMO ACE manufactured by Nippon Daishowa Paperboard Co., Ltd. (currently Nippon Paper Industries Co., Ltd.), SEMI High-Quality L, Hi BETA, Hi GAMMA, SHIRO MARI L, HAMMING, WHITE HAMMING, SEMI High-Quality Hi-L, and SHIRO MARI Hi-L manufactured by Hokuetsu Paper Mills Co., Ltd., RUBY LIGHT HREW, PEARL SOFT, and RUBY LIGHT H manufactured by Mitsubishi Paper Mills Limited, CHATON, ARISO, and SMASH manufactured by Chuetsu Pulp & Paper Co., Ltd., and STAR CHERRY and CHERRY SUPER manufactured by Marusumi Paper Co., Ltd.

Further, the size and the form of the recording medium usable in the image recording apparatus of the present embodiment are not particularly limited, as long as an image can be formed by using the image recording apparatus of the present embodiment. The recording medium may be cut to a size that is completely covered by the reaction chamber, or may have a size that protrudes from the reaction chamber. Examples of the recording medium having a size that protrudes from the recording medium chemical surface treatment device include, but are not limited to, continuous paper or film wound into a roll.

When a continuous paper or film is used, the continuous paper or the film may include cuttable perforations formed at predetermined intervals, or the continuous paper or the film may be a continuous form sheet.

If the recording medium has a size that is completely covered by the reaction chamber, the step of subjecting the recording medium to a chemical surface treatment and the step of applying an image forming material to the recording medium may not be performed consecutively within a certain period of time, and the time during which the recording medium is subjected to the chemical surface treatment is not limited. Therefore, it is possible to subject the recording medium to a gentle chemical surface treatment and then, quickly apply the image forming material to the recording medium.

However, in the case of a continuous paper or a film that are wound into a roll and have a size that protrudes from the reaction chamber, the step of subjecting the recording medium to a chemical surface treatment and the step of applying an image forming material to the recording medium are performed consecutively within a certain period of time. Therefore, it is preferable to implement the chemical surface treatment at a speed in accordance with the step of applying the image forming material to the recording medium.

In this case, it is preferable to implement the chemical surface treatment quickly. Thus, it is preferable to use chlorine dioxide of high concentration, it is preferable to emit light by using a light source having high energy of 200 to 400 nm, and it is preferable to emit light at a high light intensity.

<Image Forming Material Applying Device>

In the image recording apparatus of the present embodiment, a method used in the image forming material applying device is not particularly limited. Examples thereof include an inkjet method, an electrophotographic method, a thermal transfer method, a thermal sublimation method, a letterpress printing method, an offset printing method, a gravure printing method, and a screen printing method.

The image recording apparatus of the present embodiment can be suitably used in inkjet printing, gravure printing, or flexographic printing, in which the viscosity of the image forming material is low.

Further, in the present embodiment, the image recording apparatus can be suitably used in printing methods in which the combination of the recording medium and the image forming material is limited, such as in an inkjet method, a letterpress printing method, and a screen printing method.

—Inkjet Method—

When the image forming material applying device uses an inkjet method, ink droplets applied from an inkjet head to a recording medium form ink dots (hereinafter simply referred to as dots) on the surface of the recording medium. However, if a plurality of dots are adjacent to each other and contact each other, a beading phenomenon occurs in which the surface tension of the dots is minimized so that the dots merge and shrink. To prevent the beading phenomenon, the surface free energy that contributes to the surface tension of the recording medium is increased to increase the wettability of the ink and strengthen the dot expansion, and thus, the dots are prevented from merging. By oxidizing the surface of the recording medium, for example, by increasing the number of carboxyl groups, it is possible to increase the surface free energy of the recording medium and to prevent the beading phenomenon.

Further, as the number of carboxyl groups increases and the surface pH of the recording medium decreases, the hydrogen ions that are counter cations to the carboxyl groups of the recording medium are replaced by counter cations of anionic components such as pigments, dyes, and fine resin particles contained in the ink. Therefore, the hydrophilicity decreases and components in the ink aggregate or precipitate, which reduces the fluidity of the ink.

As described above, when an image is formed by using an inkjet method, the aggregation and the permeability of the ink pigment may be controlled to improve the circularity of the dots and prevent the dots from merging, so that it is possible to increase the sharpness of the dots and expand the color gamut. As a result, it is possible to prevent the dot merging phenomenon that accompanies liquid flow and the bleeding phenomenon that accompanies the irregular spreading of ink droplets, and thus, it is possible to form an image having high quality.

Further, in the case of a recording medium such as coated paper of which the interior is hydrophilic and the surface is hydrophobic, the hydrophobicity of the surface can be reduced by a chemical surface treatment to obtain a hydrophilic recording medium.

Therefore, the permeation of ink components into the interior of the recording medium can be promoted, which not only reduces the beading phenomenon and the bleeding phenomenon, but also promotes the fixation and drying of the ink on the surface of the recording medium.

Thus, according to the image recording apparatus of the present embodiment, it is possible to prevent the beading phenomenon and the bleeding phenomenon and form good images, even when the image forming material applying device uses an inkjet method. Further, by maintaining the thickness of the pigment aggregates on the recording medium thin and uniform, the ink droplet volume can be reduced, and thus, it is possible to reduce the energy used for drying the ink and reduce the cost.

When the image forming material applying device uses an inkjet method, a line type inkjet system including a line type head, a serial type (shuttle type) inkjet system in which a carriage performs scanning, or the like may be used.

Further, when a recording medium is subjected to a chemical surface treatment, the wettability of the ink with respect to the recording medium is improved. Therefore, when an image is formed by using an inkjet method, the applied ink dots spread, and an image different from the image expected to be formed on a recording medium that is not subjected to a chemical surface treatment may be formed.

Therefore, for example, when forming an image by using an inkjet method on a recording medium that is subjected to a chemical surface treatment, the ink ejection voltage for applying ink may be lowered and the ink droplet volume reduced, to prevent the formation of an image that differs from the image expected to be formed on a recording medium that is not subjected to a chemical surface treatment. Further, by forming an image as described above, the ink droplet volume can be reduced, and the cost can be reduced.

<<Image Forming Material>>

The image forming material that can be used in the image recording apparatus of the present embodiment is not particularly limited. However, examples thereof include, but are not limited to, a solvent-based ink, an ultraviolet-curable ink, a water-based ink, a toner, and a sublimation dye. Further, a thermal film may also be used to form an image.

When the image forming material applying device in the image recording apparatus of the present embodiment uses an inkjet method, ink can be used as the image forming material. Specifically, a solvent-based ink, an ultraviolet-curable ink, or a water-based ink can be used.

According to the image recording apparatus of the present embodiment, even if the image forming material is a liquid such as a water-based ink, problems caused by the wettability or the adhesion to the recording medium during image formation are unlikely to occur, and a good image can be formed.

When the image forming material applying device uses an electrophotographic method, a toner can be used as the image forming material. When the image forming material applying device uses a thermal transfer method, a thermal film can be used as the image forming material. When the image forming material applying device uses a thermal sublimation method, a sublimation dye can be used as the image forming material. When the image forming material applying device uses various other types of printing methods, an ink can be used as the image forming material.

In methods in which a water-based ink can be used as the image forming material, such as stencil printing, which is a type of screen printing, flexographic printing, which is a type of letterpress printing, or gravure printing, the wettability of the ink with respect to the recording medium can be improved by the chemical surface treatment in the image recording apparatus of the present embodiment. Therefore, the effects of the present embodiment can be easily achieved and high-quality images can be provided.

Further, even when an image is formed by using an ultraviolet-curable ink on a recording medium having poor ink wettability, such as an olefin film, the chemical surface treatment in the image recording apparatus of the present embodiment can be used to improve not only the wettability of the ink with respect to the recording medium, but also the adhesion. Thus, it is possible to improve the durability of the image formed on the recording medium.

<Other Devices>

In addition to the devices described above, the image recording apparatus of the present embodiment may include other devices.

The other devices include, but are not limited to, a loading device used for introducing the recording medium into the image recording apparatus of the present embodiment, an unloading device used for ejecting the recording medium from the image recording apparatus of the present embodiment, a drying device used for drying the recording medium, an image recording apparatus control device used for controlling the image recording apparatus, a cleaning device used for cleaning the surface of the recording medium after the chemical surface treatment, an image reading device used for reading an image formed on the recording medium, and various detection devices.

For example, the loading device or the unloading device may be a member that can be used to move a recording medium, such as a motor, a cable, or a stage.

A position where the image reading device is provided may be upstream or downstream of the drying device on a conveyance path of the recording medium.

The image recording apparatus of the present embodiment can be applied to various types of image recording apparatuses, and can be particularly suitably used in, for example, printers, facsimile devices, copying devices, and printer/fax/copy multifunction peripherals.

Here, an example of an image recording apparatus according to the present embodiment will be described with reference to FIGS. 1 to 8.

In the drawings, the same constituent components are denoted by the same reference numerals, and overlapping parts of the description may be omitted. Further, the numbers, positions, shapes, and the like of the following constituent members are not limited to the embodiments, and include any numbers, positions, shapes, and the like that are preferable for implementing the present embodiment.

Figure 1B:
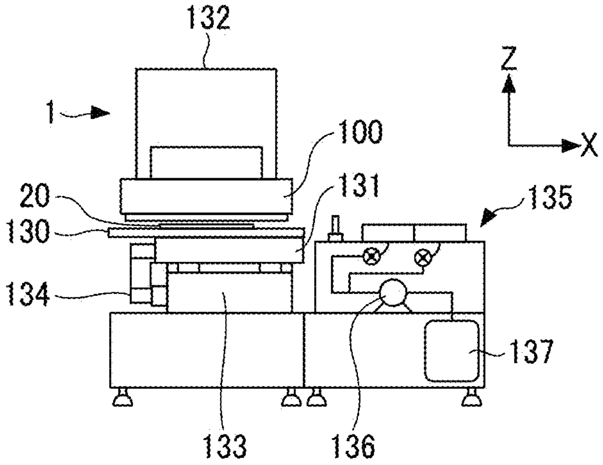
Figure 1C:
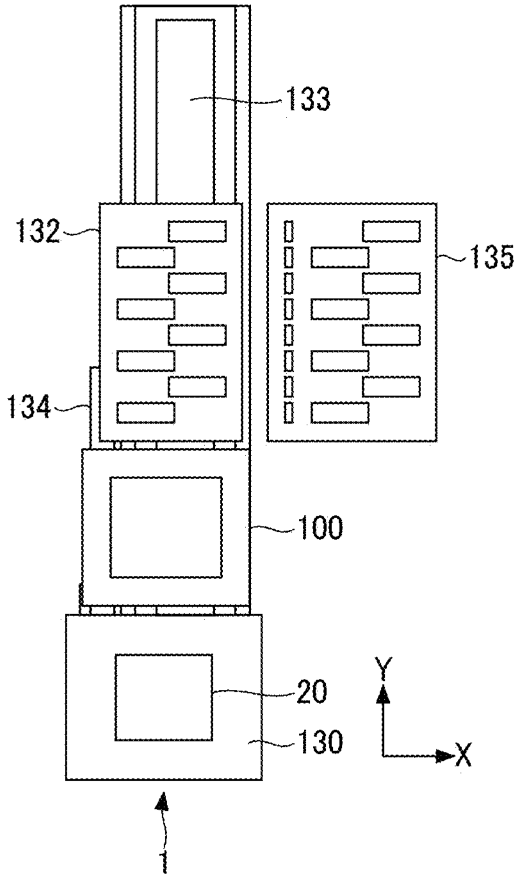

FIGS. 1A to 1C are schematic diagrams illustrating an image recording apparatus according to one embodiment of the present invention, viewed from the side, the front, and the top, respectively.

FIG. 1A illustrates an image recording apparatus 1, viewed from the side. The side surface of the image recording apparatus 1 illustrated in FIGS. 1A to 1C refers to a Y-Z plane of the image recording apparatus 1.

FIG. 1B illustrates the image recording apparatus 1, viewed from the front. The front surface of the image recording apparatus 1 illustrated in FIGS. 1A to 1C refers to an X-Z plane of the image recording apparatus 1.

FIG. 1C illustrates the image recording apparatus 1, viewed from the top. The top surface of the image recording apparatus 1 illustrated in FIGS. 1A to 1C refers to an X-Y plane of the image recording apparatus 1.

The image recording apparatus 1 in FIGS. 1A to 1C includes a processing table 130 that attracts and fixes a recording medium 20, a linear stage 131 to which the processing table 130 is fixed, a linear motor 133 that conveys the linear stage 131 to a reaction chamber 151 or below a head module 132, and a linear stage cable 134 that connects the linear stage 131 and the linear motor 133. For example, in the head module 132, which serves as an image forming unit, a full line-type head array for four colors black (K), cyan (C), magenta (M), and yellow (Y) (hereinafter referred to as "head array" when no distinction is made between colors) is arranged from the upstream side in a medium conveyance direction.

The head array is formed by arranging image forming material applying heads (hereinafter simply referred to as "heads") in a staggered pattern on a base member, but is not limited thereto.

The head array serves as an image forming material applying device, and applies an image forming material including black (K), cyan (C), magenta (M), and yellow (Y), to the conveyed recording medium. The types and the numbers of colors are not limited to the ones mentioned above. That is, the head array may further include heads corresponding to green (G), red (R), and other colors, or may include only a head of black (K) color.

The head module 132 includes components used for discharging ink other than the head array, such as an ink tank that supplies ink to each head, a control device that electrically controls the head, and a pressure adjustment device that adjusts and stabilizes the pressure of the ink supplied to the head. The water level and the pressure in the tank are adjusted so that the ink pressure applied to each head takes an appropriate value.

A maintenance module 135 is provided next to the head module 132 on a side intersecting a movement direction of the linear motor 133. The maintenance module 135 includes a cap that forms a pair with the head provided in the head module 132. A waste liquid port is provided in a bottom part of the cap, and is connected to a suction pump 136 and a waste liquid tank 137 via individual valves.

The cap is provided so that the cap closely adheres to the head when image formation is not performed to prevent the head from drying, and can suck and eliminate thickened ink and air bubbles from the head to maintain the application properties of the image forming material.

In the maintenance module 135, a wiper is provided between the head and the cap. The wiper wipes the nozzle surface of the head to which ink adheres by suction with the cap, forms a meniscus in the nozzle, and maintains the nozzle surface of the head clean.

FIGS. 2A to 2H are schematic diagrams illustrating a series of operations for subjecting a recording medium to a chemical surface treatment in the image recording apparatus according to the present embodiment.

First, a constant amount of chlorine dioxide gas is generated by the chlorine dioxide gas source, and a suction pump at a front end of an exhaust pipe 138 is operated.

Figure 2A:
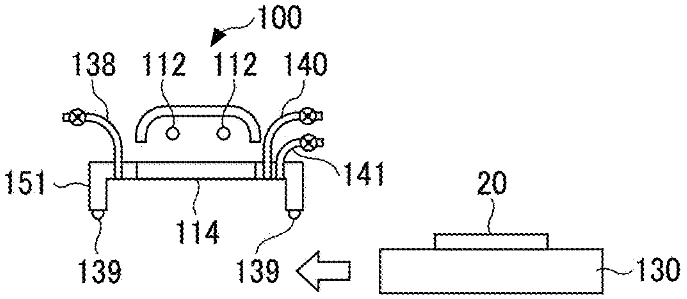
FIGS. 2A to 2H are schematic diagrams illustrating a series of operations for subjecting a recording medium to a chemical surface treatment in an image recording apparatus according to one embodiment of the present invention.

The recording medium 20 is fixed to the processing table 130, and the processing table 130 moves to a position directly below the reaction chamber 151 (FIG. 2A).

Figure 2B:
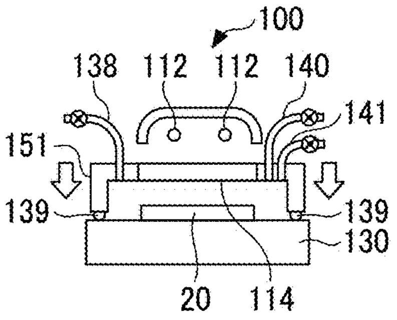

The reaction chamber 151 descends and presses against a nip member 139, so that the reaction chamber 151 closely adheres to the processing table 130 (FIG. 2B).

Figure 2C:
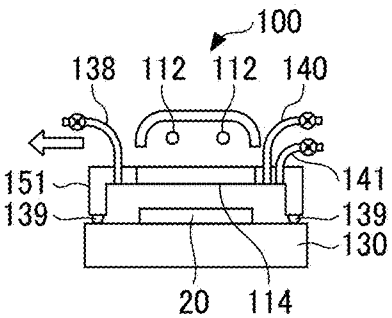

An exhaust valve provided in the exhaust pipe 138 is opened to exhaust the air from within the sealed space formed by the reaction chamber 151 and the processing table 130, and thus, a vacuum is created in the sealed space (FIG. 2C).

Figure 2D:
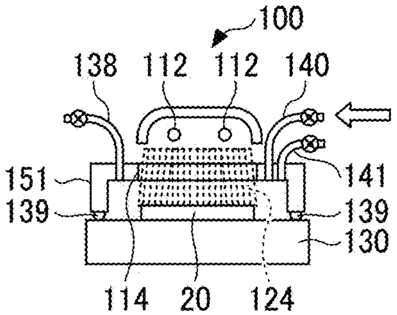

The exhaust valve is closed and a light source 112 is illuminated. A chlorine dioxide gas valve provided in a chlorine dioxide gas pipe 140 is opened, and the reaction chamber 151 is filled with gas containing chlorine dioxide (FIG. 2D).

Figure 2E:
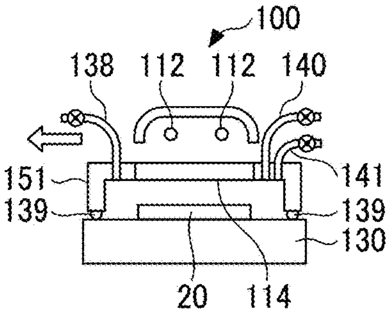

After a predetermined reaction time, the light source 112 is extinguished. The chlorine dioxide gas valve is closed and the exhaust valve is opened to exhaust the gas within the reaction chamber 151 and create a vacuum (FIG. 2E).

Figure 2F:
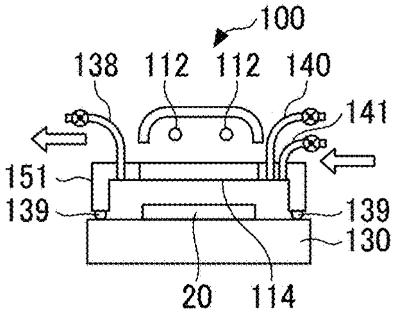

An air valve provided on an air pipe 141 is opened to ventilate the reaction chamber 151, and thus, reaction residues and the gas containing chlorine dioxide are washed away (FIG. 2F).

Figure 2G:
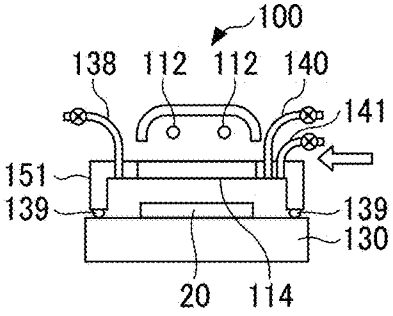

The exhaust valve is closed, and the pressure inside the reaction chamber 151 is returned to atmospheric pressure (FIG. 2G).

Figure 2H:
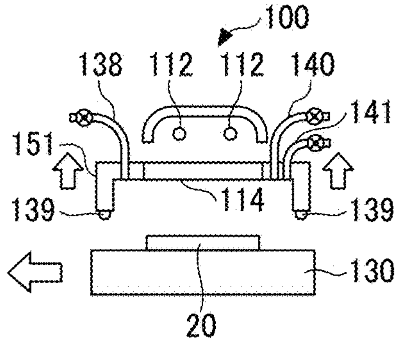

The air valve is closed, the reaction chamber 151 is raised to a position where the reaction chamber 151 does not interfere with the recording medium 20, and the recording medium 20 is moved to the next step (FIG. 2H).

FIGS. 3A to 3F are schematic diagrams illustrating a series of processes for subjecting a recording medium to a chemical surface treatment and applying an image forming material to the recording medium in the image recording apparatus according to he present embodiment.

The recording medium 20 is placed on the processing table 130 provided on the linear stage 131, and an electrostatic chuck is operated to fix the recording medium 20 to the processing table 130. The linear stage 131 moves from a home position (L0) at a speed v1, and stops at a position (L1) directly below the reaction chamber 151 (FIG. 3A).

Figures 3A, 3B, 3C, 3D, 3E, 3F:
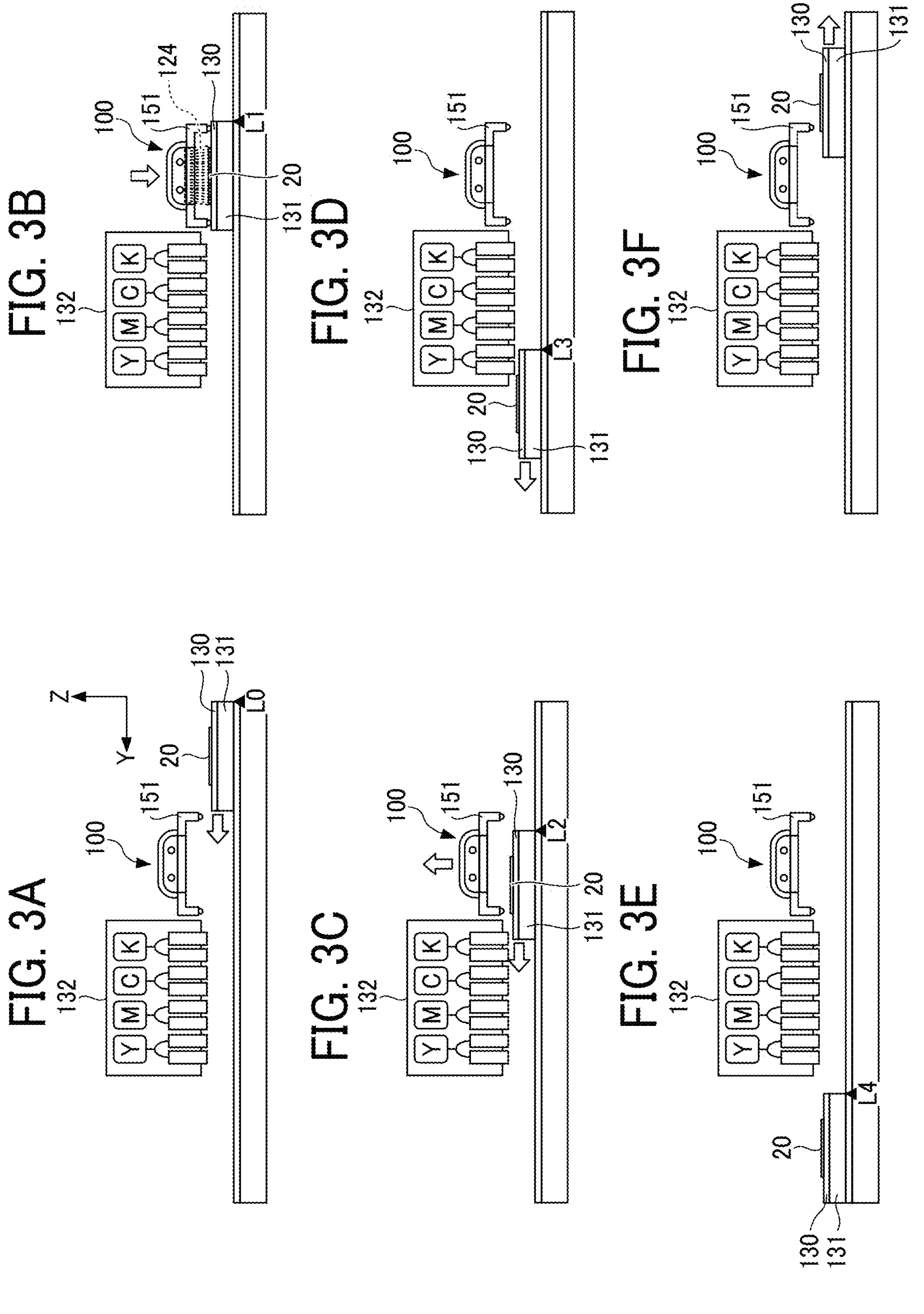
FIGS. 3A to 3F are schematic diagrams illustrating a series of processes for subjecting a recording medium to a chemical surface treatment and applying an image forming material to the recording medium in an image recording apparatus according to one embodiment of the present invention.

A chemical surface treatment device is lowered onto the processing table 130 and performs chemical surface treatment on the recording medium 20 (FIG. 3B).

The reaction chamber 151 rises and stops at a position where the reaction chamber 151 does not interfere with the recording medium 20, and then, accelerates to a speed v2 and moves from the position (L1) directly below the reaction chamber 151 to a print start position (L2) (FIG. 3C).

The recording medium 20 is conveyed at the speed v2, while black K, cyan C, magenta M, and yellow Y image forming materials are applied to the recording medium 20, and the recording medium 20 moves to an image formation end position (L3) (FIG. 3D). The recording medium 20 decelerates while moving to a stop position (L4) (FIG. 3E).

The linear stage 131 moves from the stop position (L4) to the home position (L0) at the speed v1 and then stops. At the home position (L0), the electrostatic chuck is stopped and the recording medium 20 is collected (FIG. 3F).

The head module 132 can be moved in an up-down direction by a lifting and lowering mechanism, and also includes a movement mechanism that moves in a horizontal direction up to the top part of the maintenance module.

After the image is formed, the head module 132 rises on the linear stage 131, then moves in the horizontal direction to a position directly above the maintenance module, where each head and cap stops at a corresponding position. Subsequently, the head module 132 descends to cap the heads to prevent the heads from drying.

Figure 4:
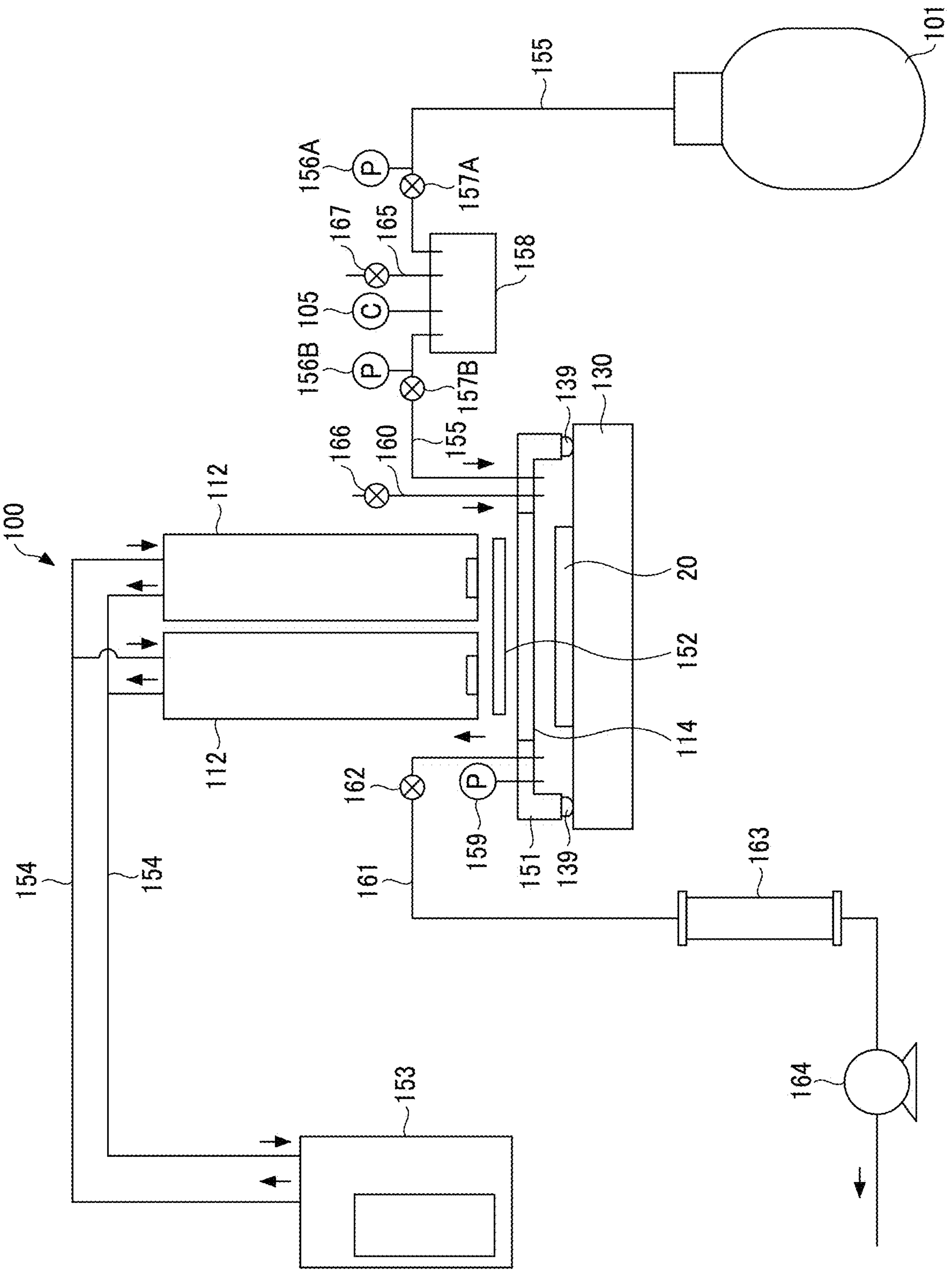
FIG. 4 is a schematic diagram of a recording medium chemical surface treatment device in an image recording apparatus according to one embodiment of the present invention.

FIG. 4 is a schematic diagram of a recording medium chemical surface treatment device in the image recording apparatus according to the present embodiment.

A chemical surface treatment device 100, which serves as a recording medium chemical surface treatment device, includes the processing table 130 which is also a part of the conveyance mechanism, the reaction chamber 151, and the nip member 139 that causes the reaction chamber 151 and the processing table 130 to closely adhere to each other to prevent contact with the exterior.

The processing table 130 includes an electrostatic adsorption device (electrostatic chuck), and the recording medium 20 can be fixed to the processing table 130 by placing the recording medium 20 on the processing table 130 and operating the electrostatic chuck. A method of fixing a recording medium to the processing table 130 is not limited to electrostatic adsorption, and it is also possible to clamp and fix a recording medium with a clip or use vacuum suction adsorption.

The reaction chamber 151 includes an irradiation window 114 in a top part. The light source 112 is provided above the irradiation window 114 that is provided in the upper part of the reaction chamber 151. Light emitted from the light source 112 irradiates the reaction chamber 151 via the irradiation window 114 and hits the recording medium 20 on the processing table 130.

The top part of the reaction chamber 151 and the light source 112 can be moved in the up-down direction by a lifting and lowering mechanism. A light diffusion plate 152 is provided between the light source 112 and the recording medium 20.

The light source 112 is connected to a water cooling circulator 153 and a light source cooling pipe 154, and cooling water is circulated through the water cooling circulator 153 and the light source cooling pipe 154 to cool the light source 112.

The top part of the reaction chamber 151 is directly or indirectly connected to a chlorine dioxide gas pipe 155 that supplies chlorine dioxide gas. The chlorine dioxide gas pipe 155 includes a chlorine dioxide gas source 101 supplying chlorine dioxide gas, a supply gas pressure gauge 156A that adjusts the supply amount of gas, a supply gas pressure gauge 156B, a chlorine dioxide gas valve 157A, a chlorine dioxide gas valve 157B, a chlorine dioxide concentration meter 105, a concentration adjusting chamber 158, an air pipe 165, and an air valve 167.

The top part of the reaction chamber 151 includes an in-chamber pressure gauge 159, an air pipe 160 that takes in air into the chamber, and an exhaust pipe 161 used for exhausting gas from within the chamber, to appropriately manage the reaction conditions in the chemical surface treatment and the replacement of gases.

The air pipe 160 communicates with the outside air, and includes an air valve 166 that can be opened and closed.

The exhaust pipe 161 includes an exhaust valve 162 that controls exhaust from within the chamber, an exhaust gas adsorption column 163 that adsorbs and removes toxic gas components in the exhaust gas, and an exhaust pump 164 that sucks and discharges gas.

Figure 5:
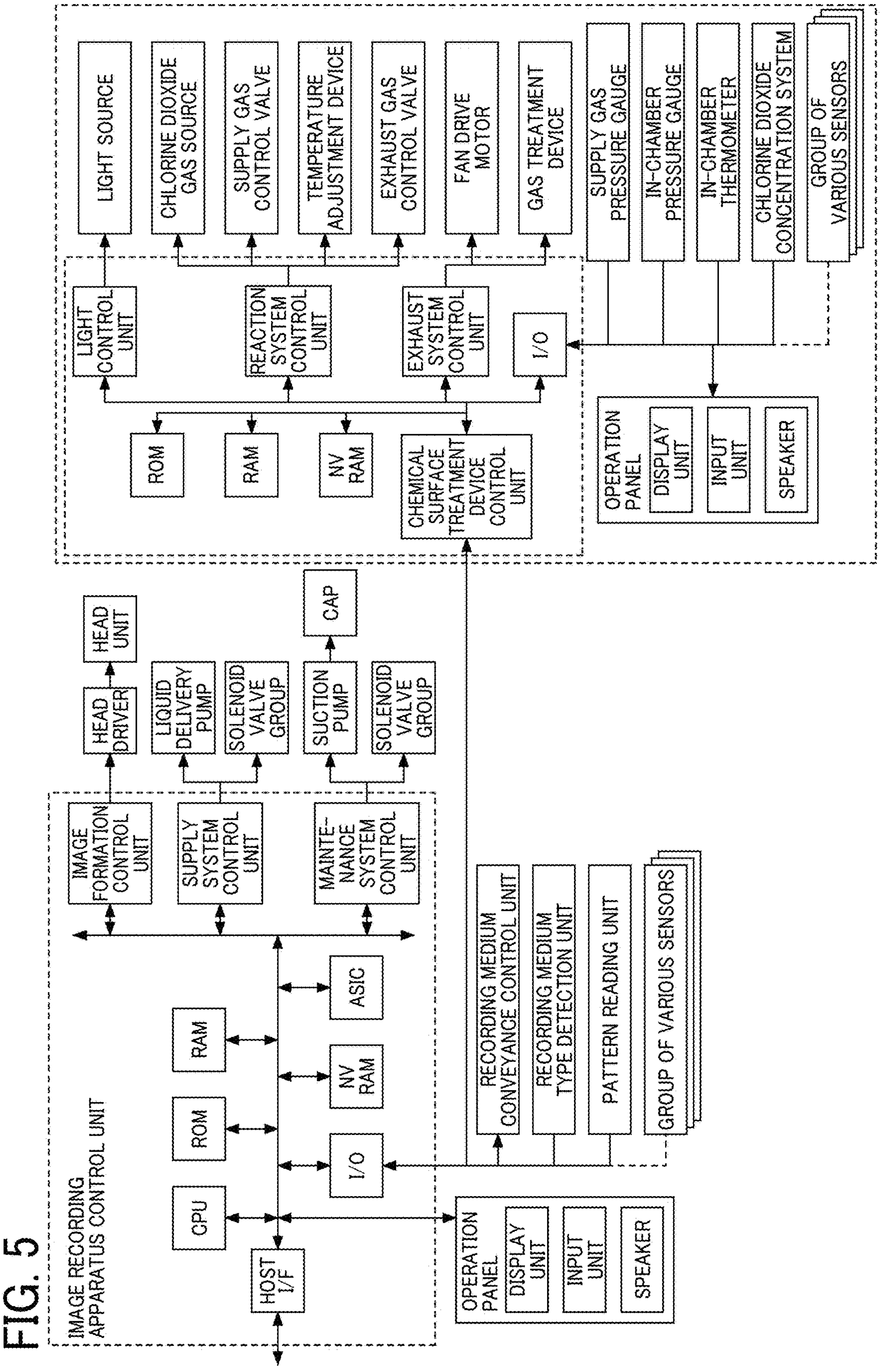
FIG. 5 is a block diagram illustrating an outline of a control process in an image recording apparatus according to one embodiment of the present invention.

FIG. 5 is a block diagram illustrating an outline of a control process in the image recording apparatus according to the present embodiment.

An image recording apparatus control unit includes a CPU that controls the image recording apparatus overall, a ROM that stores fixed data such as various types of programs including a program to be executed by the CPU, and a RAM that temporarily stores image data and the like. The image recording apparatus control unit includes a rewritable non-volatile memory NVRAM used for retaining data, even at a time when the power supply to the image recording apparatus is cut off.

The image recording apparatus control unit includes an ASIC that processes various types of signals relating to image data, performs image processing such as sorting, and processes input/output signals for other control processes.

The image recording apparatus control unit includes an image formation control unit and a head driver. The image formation control unit includes a data transfer device, a drive signal generating device, and a bias voltage output device, which are used for driving and controlling each head of the head unit. The head driver includes a drive IC used for driving each head.

The image recording apparatus control unit includes a supply system control unit that drives and controls a liquid delivery pump and a group of solenoid valves.

The image recording apparatus control unit includes a maintenance system control unit that drives and controls a suction pump connected to the cap and a group of solenoid valves.

An operation panel used for inputting and displaying information used in the image recording apparatus is connected to the image recording apparatus control unit.

The image recording apparatus control unit includes an I/O unit.

The I/O unit can acquire read data from a pattern reading unit and information from various sensors. The I/O unit extracts information used for controlling the apparatus, and uses the information for control processes by the image formation control unit, the supply system control unit, the maintenance system control unit, and the image formation control unit.

The I/O unit can also exchange information with a recording medium conveyance control unit and a chemical surface treatment device control unit of the chemical surface treatment device serving as the recording medium chemical surface treatment device, to control the recording medium conveyance control unit and the chemical surface treatment device control unit.

The chemical surface treatment device includes the chemical surface treatment device control unit. The chemical surface treatment device control unit includes a ROM that stores fixed data such as various types of programs including a program to be executed by the chemical surface treatment device control unit, a RAM used for temporarily storing image data and the like, and a rewritable non-volatile memory NVRAM used for retaining data, even at a time when the power supply to the device is cut off.

The chemical surface treatment device includes an operation panel used for inputting and displaying information used in the device, and the operation panel is connected to the chemical surface treatment device control unit.

The chemical surface treatment device control unit includes a light control unit that controls the light source.

The chemical surface treatment device control unit includes a reaction system control unit that controls the chlorine dioxide gas source, a supply gas control valve, a temperature adjustment device, and an exhaust gas control valve.

The chemical surface treatment device control unit includes a fan drive motor and an exhaust system control unit that controls a gas treatment device.

The chemical surface treatment device control unit includes an I/O unit that acquires information from a supply gas pressure gauge, an in-chamber pressure gauge, an in-chamber thermometer, and a chlorine dioxide concentration meter.

The chemical surface treatment device control unit is connected via the I/O unit to an operation panel used for inputting and displaying information used in the device.

Therefore, the chemical surface treatment device can be driven independently of the image recording apparatus.

Figure 6:
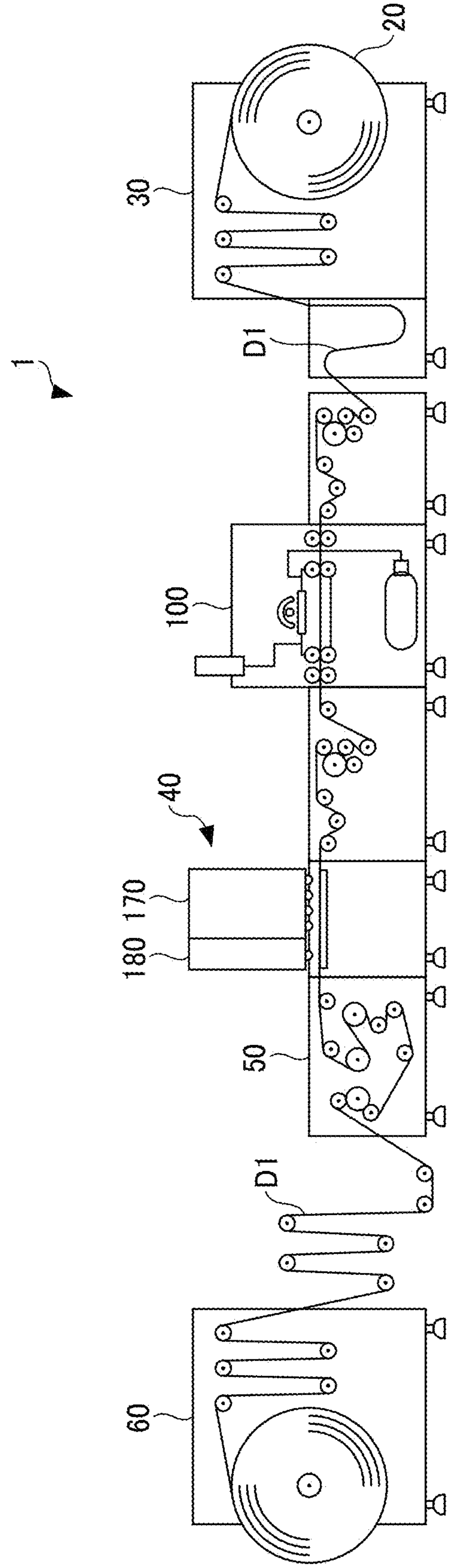
FIG. 6 is a schematic diagram of an image recording apparatus according to one embodiment of the present invention.

FIG. 6 is a schematic diagram of the image recording apparatus according to the present embodiment.

As illustrated in FIG. 6, the image recording apparatus 1 includes a loading unit 30 that introduces the recording medium 20 having a roll shape along a conveyance path D1, the chemical surface treatment device 100 serving as a recording medium chemical surface treatment device, and an image forming unit 40.

In FIG. 6, the image forming material applying device uses an inkjet method.

The image forming unit 40 includes an inkjet head 170 and a pattern reading unit 180.

The pattern reading unit 180 is provided downstream of the inkjet head 170.

After the recording medium 20 is subjected to a chemical surface treatment by the chemical surface treatment device 100, an image forming material applied from the inkjet head 170 is used to form an image on the surface of the recording medium 20.

The pattern reading unit 180 reads and acquires a dot image of the image formed on the recording medium 20. The acquired dot image is analyzed to calculate the circularity of the dots, the dot diameter, the variation in density, and the like, and the results are used to control the chemical surface treatment device 100 by feedback control or feedforward control.

The image recording apparatus 1 includes a drying unit 50 that dries the recording medium 20 on which the image is formed, and an unloading unit 60 that ejects the recording medium 20 on which the image is formed.

Further, the image recording apparatus 1 includes a control unit that controls an operation of each unit.

Figure 7:
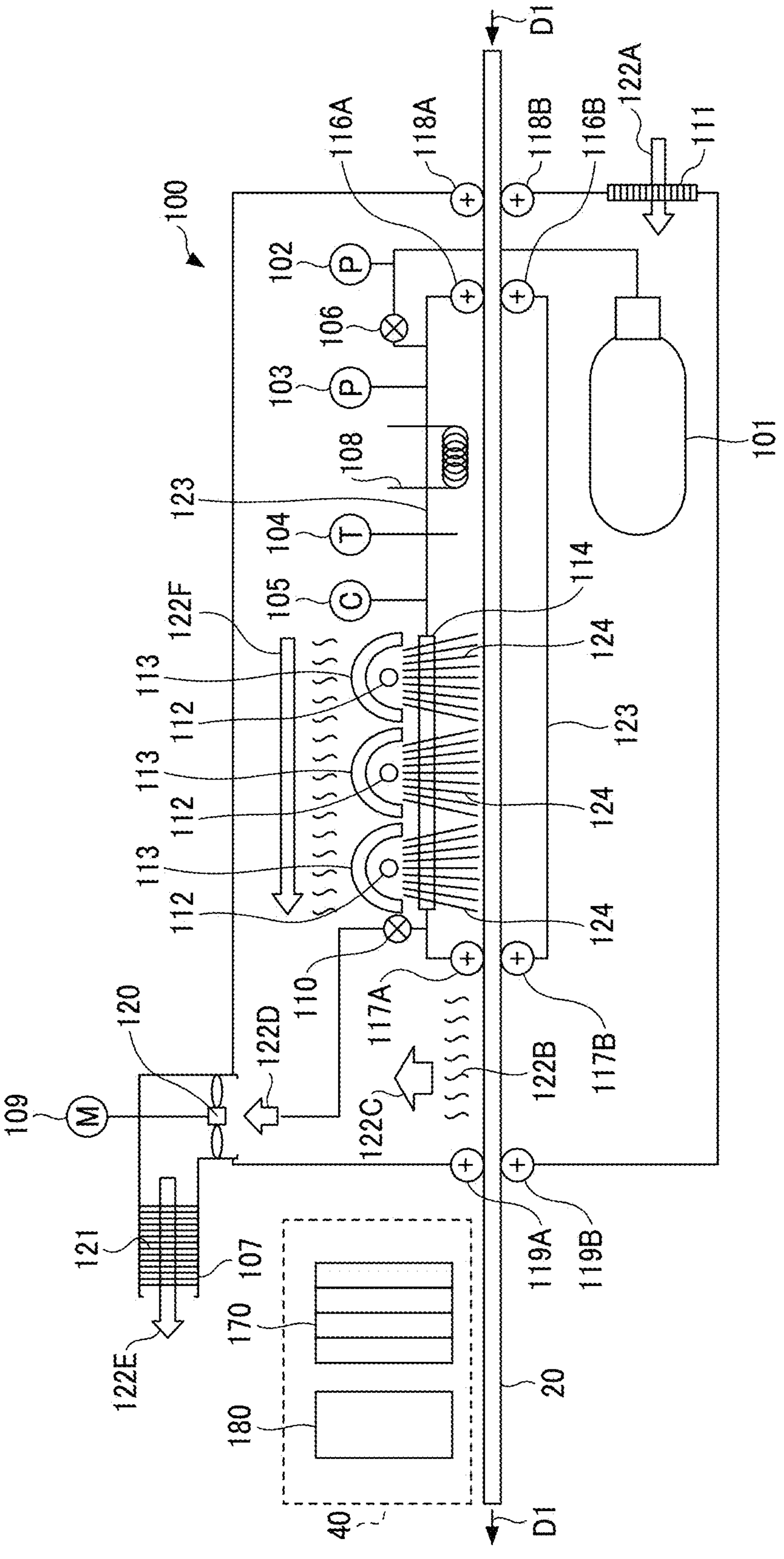
FIG. 7 is a schematic diagram illustrating a state where a recording medium is subjected to a chemical surface treatment in an image recording apparatus according to one embodiment of the present invention.

FIG. 7 is a schematic diagram illustrating a state where a recording medium is subjected to a chemical surface treatment in the image recording apparatus according to the present embodiment.

The chemical surface treatment device 100 serving as the recording medium chemical surface treatment device, generates chlorine dioxide gas. Thus, to prevent the gas from diffusing to the outside, the recording medium 20 conveyed along the conveyance path D1 is sandwiched between a roller 118A, a roller 118B, a roller 119A, and a roller 119B to separate the inside and the outside of the chemical surface treatment device 100.

The chemical surface treatment device 100 includes a reaction chamber 123 in which the chemical surface treatment is performed, and a roller 116A, a roller 116B, a roller 117A, and a roller 117B that sandwich the conveyed recording medium 20 to trap the chlorine dioxide gas, separate the inside and the outside of the reaction chamber 123, and convey the recording medium 20 into and out of the chamber.

The reaction chamber 123 includes the chlorine dioxide gas source 101 supplying chlorine dioxide gas, a supply gas pressure gauge 102 that adjusts the supply amount, and a supply gas control valve 106. To appropriately manage the reaction conditions in the chemical surface treatment, the reaction chamber 123 includes an in-chamber pressure gauge 103, an in-chamber thermometer 104, a chlorine dioxide concentration meter 105, a temperature adjustment device 108, and an exhaust gas control valve 110.

The chemical surface treatment is performed in a chamber in an atmosphere of chlorine dioxide gas of which the temperature, the pressure, and the concentration are adjusted. Light is generated from the light source 112 in the chemical surface treatment device 100, a light guide plate 113 is used to control the irradiation direction of the light, and the surface of the recording medium 20 is irradiated with light 124 from the irradiation window 114 that transmits light and is provided in the reaction chamber 123.

After the chemical surface treatment, chlorine dioxide gas, chlorine gas generated in the reaction, and hydrochloric acid gas are adsorbed on the surface of the recording medium 20. The chlorine dioxide gas and reaction gas in the reaction chamber 123 are harmful substances, and thus, are treated in the chemical surface treatment device 100 and then exhausted.

In the airflow inside the chemical surface treatment device 100, external air is taken in from an intake port 111, and exhausted from the reaction chamber 123 to the outside of the device via an exhaust duct 107 by an exhaust fan 120 driven by a fan drive motor 109.

External air 122A taken in from the intake port 111 guides, toward the fan (in the direction indicated by an arrow 122C), adsorbed gas 122B desorbed from the recording medium 20 conveyed into the chemical surface treatment device 100, and is sucked in by the exhaust fan 120 together with exhaust gas 122D in the reaction chamber. These exhaust gases are treated by a chlorine dioxide-derived compound adsorption mechanism 121 to adsorb chlorine dioxide-derived compounds to be exhausted as exhaust gas 122E to the outside of the device.

Figure 8:
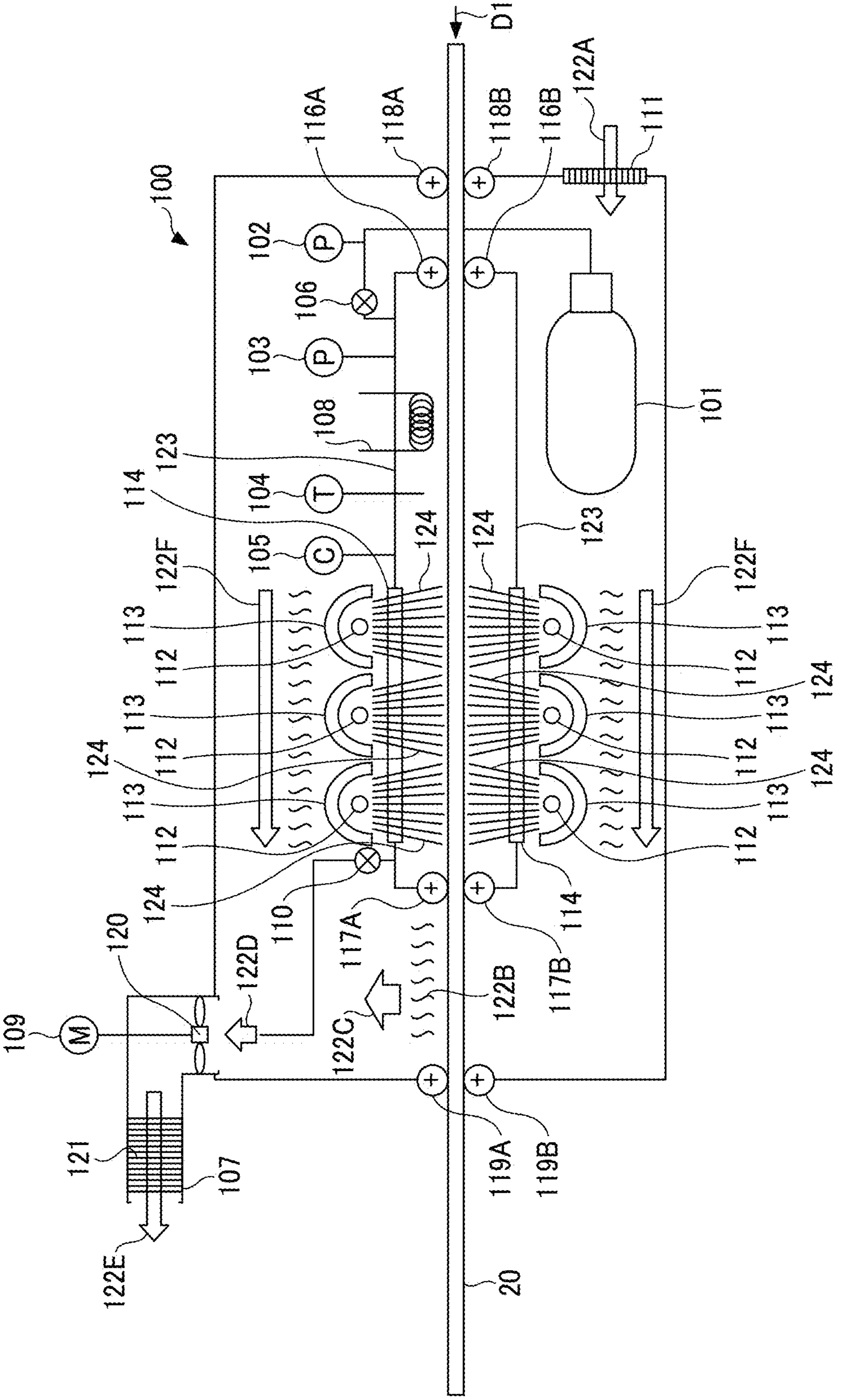
FIG. 8 is a schematic diagram illustrating a state where a recording medium is subjected to a chemical surface treatment in an image recording apparatus according to one embodiment of the present invention.

The external air 122A circulates within the chemical surface treatment device 100 to act as an air flow 122F for cooling the heat generated by the light source 112, and is exhausted to the outside of the chemical surface treatment device 100 by the exhaust fan 120. FIG. 8 is a schematic diagram illustrating another state where a recording medium is subjected to a chemical surface treatment in an image recording apparatus according to the present embodiment.

The chemical surface treatment in the chemical surface treatment device 100 serving as the recording medium chemical surface treatment device, is not limited to be performed on one side of the recording medium 20, but on both sides of the recording medium 20 may be treated.

The chemical surface treatment on both sides of the recording medium 20 is performed in reaction chambers 123 in an atmosphere of chlorine dioxide gas of which the temperature, the pressure, and the concentration are adjusted. The light guide plate 113 is used to control the irradiation direction of light generated from light sources 112 arranged above and below the conveyance path in the chemical surface treatment device 100, and the surface of the recording medium 20 is irradiated with light from irradiation windows 114 that transmit light and are provided in the reaction chambers 123 above and below the conveyance path.

Here, with reference to FIGS. 9 to 12, the present embodiment will be described in detail.

Note that the present invention is not limited to the embodiment described with reference to FIGS. 9 to 12, and various modifications are possible without departing from the spirit of the present invention.

Figure 9:
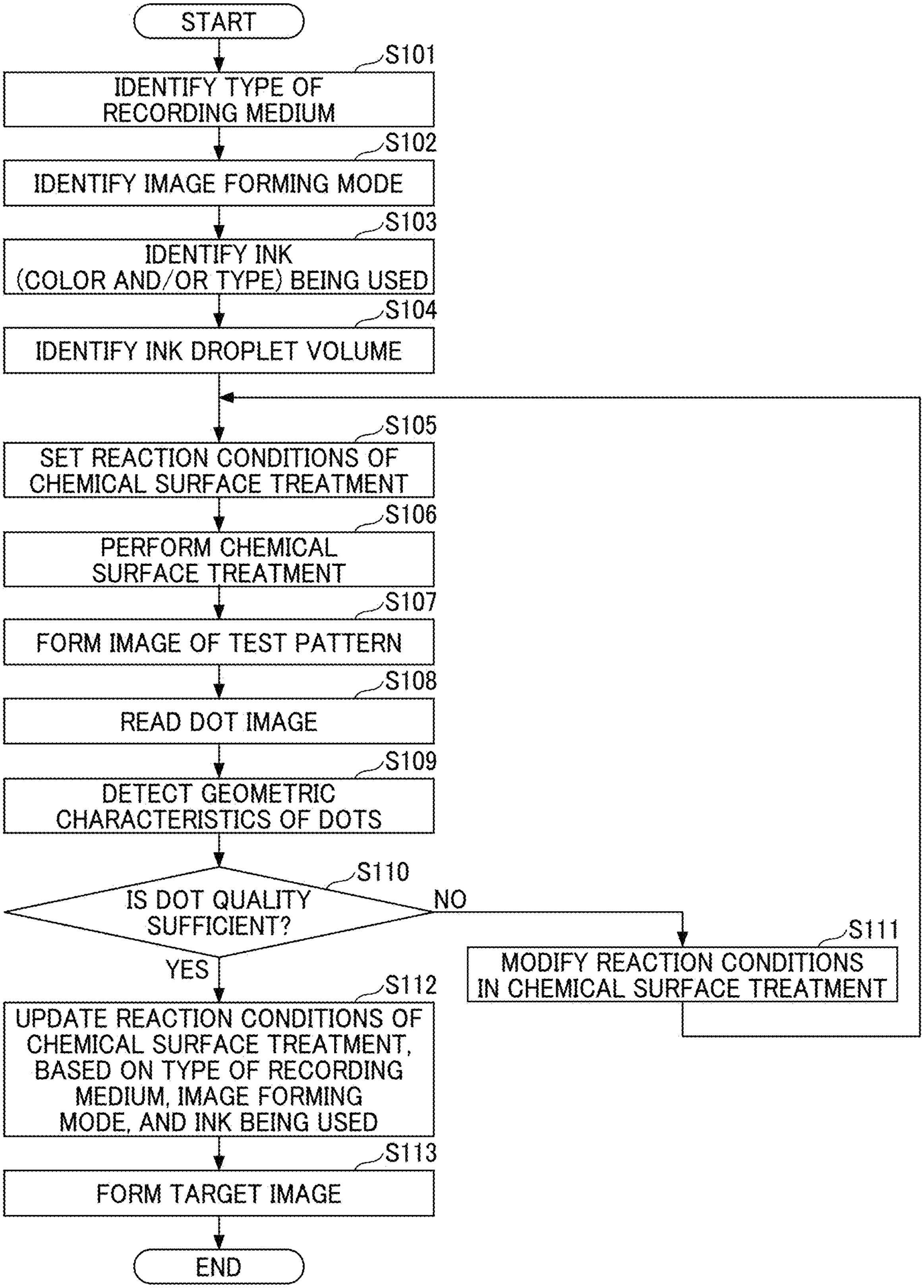
FIG. 9 is a flow chart illustrating a flow of steps to be performed by an image recording apparatus according to one embodiment of the present invention.

FIG. 9 is a flow chart illustrating a flow of steps to be performed by the image recording apparatus according to the present embodiment.

FIG. 9 illustrates a case where ink is used as the image forming material and the image forming material applying device uses an inkjet method.

As illustrated in FIG. 9, first, the image recording apparatus control unit identifies the type of the recording medium (step S101). The type of the recording medium may be set and input by a user from a control panel into the image recording apparatus. Alternatively, the image recording apparatus may include a recording medium type detection device, and the image recording apparatus control unit may identify the type of the recording medium, based on property information of the recording medium detected by the recording medium type detection device. A method used to identify the type of the recording medium is not limited. However, the image recording apparatus control unit may identify the type of the recording medium from measured property information, based on a database including recording medium property information and the type. Alternatively, the image recording apparatus control unit may identify the type of the recording medium from property information measured by using artificial intelligence (AI), in which the AI learning links the recording medium property information as training information to the type of the recording medium. For example, the recording medium type detection device may be a device that irradiates the surface of the recording medium with laser light and analyzes an interference spectrum of the reflected light to identify the type of the recording medium, or a device that measures the thickness of the recording medium to identify the recording medium, or a barcode reader that reads a barcode containing recording medium type information formed as an image on the surface of the recording medium.

Moreover, the image recording apparatus control unit identifies an image forming mode (step S102).

The image forming mode is, for example, the resolution of the image to be formed (such as 600 dpi and 1200 dpi) and the image creation speed (linear speed), and may be set by the user using an input unit, for example. Alternatively, the image forming mode may be input together with the image data (raster data) from an external higher-level device (for example, a DFE 210 described later).

Next, the image recording apparatus control unit identifies the color and/or the type of the ink being used (the ink to be used) to form a target image (step S103).

In this case, one color or type of ink to be used may be identified in the entire image data used for forming the target image, or the image data may be divided into regions according to the type of ink to be used (or according to each object contained in the image data) and the color or the type of the ink to be used may be identified for each region.

For example, the type of the ink to be used can be identified from the color used in raster data of the input image data and the type of ink set in an inkjet head or an ink tank of an ink supply unit.

For example, the color of the ink to be used can be identified from the color used in the raster data of the input image data and the color of the ink set in the inkjet head or the ink tank of the ink supply unit.

The color of the ink and the type of the ink (such as the product number) set in the inkjet head may be set and input to the image recording apparatus by the user via a control panel, or the inkjet head may include a detection unit that detects the color and the type of the set ink.

There are recording medium types that are compatible with the type of the ink to be used, and thus, the detected recording medium type is compared with a recording medium compatible with the type of the ink to be used. If the detected recording medium is incompatible, a warning is displayed for the user on the control panel to decide whether to execute the operation.

If the color of the ink to be used does not match the color used in the raster data, a warning is displayed for the user on the control panel to decide whether to execute the operation.

Next, the image recording apparatus control unit identifies the ink droplet volume used to form an image (step S104).

For example, the ink droplet volume is identified based on the resolution and the linear speed of the identified image forming mode, by referring to a drive waveform selection table that is held in the control unit and associates a drive waveform with the ink type, the resolution, and the linear speed, to select the drive waveform to be used, and referring to a droplet volume table in which the average ink droplet volume corresponds to the droplet size of the drive waveform.

For example, when using black ink for coated paper, an image forming mode of 1200 dpi, and a linear speed of 50 m/min, a dedicated drive waveform can be selected, and the ink droplet volume when applying small droplets from the selected drive waveform can be identified as 2 picoliters (pl), based on the table.

Further, when using cyan ink for coated paper, an image forming mode of 600 dpi, a linear speed of 100 m/min, and a dot size including large droplets, the ink droplet volume can be identified as 15 picoliters (pl).

A dot size table in which the resolution and the droplet size of the drive waveform are associated is stored in the control unit. A desired dot size is identified by referring to resolution information of the image forming mode and the dot size in the table.

The actual dot size is the size of the droplets applied from the inkjet head, or the size of the dots formed on the recording medium, and may be identified by the image recording apparatus control unit from image information of an image formation target.

Next, the image recording apparatus control unit sets reaction conditions for the chemical surface treatment (step S105).

Optimal reaction conditions for the chemical surface treatment may be identified as the reaction conditions to be set. The optimal reaction conditions may be identified as desired as the reaction conditions in the chemical surface treatment, based on the identified color and/or type of the ink to be used, the type of the recording medium, and the ink droplet volume, using a table including the concentration and the pressure of the gas, the reaction temperature, and the accumulated light amount as the reaction conditions in the chemical surface treatment.

Next, the image recording apparatus control unit controls the supply amount, based on the set reaction conditions for the chemical surface treatment, to obtain the chlorine dioxide gas concentration, and controls a predetermined temperature and the amount of light emitted by the light source, to subject the recording medium 20 to the chemical surface treatment (step S106).

Subsequently, the image recording apparatus control unit forms an image of a test pattern on the recording medium after the chemical surface treatment (step S107).

Next, the image recording apparatus control unit uses a pattern reading unit to capture an image of the dots of the test pattern, to read an image of the dots (a dot image) formed on the recording medium after the chemical surface treatment (step S108).

Next, the image recording apparatus control unit detects the geometric characteristics of the dots from the read dot image (step S109).

The geometric characteristics of the dots include the circularity of the dots, the dot diameter, and the density difference of the dots, and these characteristics are detected. The image recording apparatus control unit may also determine the state of merging between the dots from the read dot image. For example, the state of merging between the dots can be determined by pattern recognition.

Subsequently, the image recording apparatus control unit determines whether the quality of the formed dots is sufficient, based on the detected circularity of the dots, the dot diameter, and the deviation in the pigment concentration of the dots, or the state of merging between the dots (step S110).

If the quality of the formed dots is not sufficient (step S110; NO), the image recording apparatus control unit modifies the reaction conditions in the chemical surface treatment in accordance with the detected geometric characteristics of the dots (step S111). The processing returns to step S105, and the image recording apparatus control unit sets again the reaction conditions of the chemical surface treatment, and analyzes the dots from the image formed of the test pattern.

For example, in this modification, values of the reaction conditions of the chemical surface treatment set in advance with a correction value of a predetermined amount may be increased or decreased. Alternatively, the optimal reaction conditions of the chemical surface treatment may be determined, based on the detected geometric characteristics of the dots, to set the values to the values of the optimal reaction conditions.

On the other hand, if the dots have sufficient quality (step S110; YES), the image recording apparatus control unit updates the optimal values of the registered reaction conditions in the chemical surface treatment, based on the identified type of the recording medium, the image forming mode, and the ink to be used (step S112), actually forms the target image to be formed (step S113), and terminates the operation after image forming is completed.

Note that steps S101 to S112 in FIG. 9 may be performed separately from the actual image formation process (step S113).

That is, a reaction conditions table of the chemical surface treatment may be created and updated in a separate process independent of the actual image forming. For example, the image recording apparatus may have a configuration in which a user can instruct the image recording apparatus to execute steps S101 to S112 before the start of the image formation process or during the image formation process. Alternatively, the image recording apparatus may detect a change in the dot diameter during the process of forming an image, and a state where the detected dot diameter changes significantly or exceeds an acceptable range may be used as a trigger to interrupt the image formation process and automatically execute steps S101 to S112.

Further, steps S107 to S112 may be performed in the image formation process or at a predetermined timing, and in the actual image formation, step S113 may be executed after step S106.

Further, when rolled paper is used as the recording medium, in steps S106 to S112, the tip end portion of the paper guided by a paper feeding device may be used to acquire a dot image formed after the chemical surface treatment. When using rolled paper, the properties within one roll are almost unchanged. Thus, the reaction conditions for the chemical surface treatment are adjusted by using the tip end portion, and then, the same settings can be used for stable continuous image formation. However, if the rolled paper is stopped during a long period of time and not completely used up, the properties of the paper may change. Therefore, before image formation is resumed, it is preferable to similarly acquire again a dot image formed after the chemical surface treatment, by using the tip end portion of the paper and analyze the acquired dot image.

Further, the tip end portion may be used to analyze a dot image formed after the chemical surface treatment to adjust the reaction conditions of the chemical surface treatment, and then, dot images may be measured periodically or continuously to adjust the reaction conditions of the chemical surface treatment. Thus, it is possible to perform more precise and stable control.

Further, in FIG. 9, the conditions are determined by using a general method. However, the present embodiment is not limited to this method. For example, initial reaction conditions of the chemical surface treatment may be set to minimum values, and the reaction conditions of the chemical surface treatment may be gradually changed, based on analysis results of the obtained dot image of the test pattern.

For example, when the light irradiation amount of the light in the reaction conditions of the chemical surface treatment is gradually increased from a minimum value, the light irradiation amount of the light source in FIG. 7 may be changed to gradually increase, or the conveyance speed of the recording medium, that is, the irradiation time of the light, may be changed.

In step S108 in FIG. 9, a test pattern TP formed as described above is read by the pattern reading unit 180 in FIG. 7.

Figure 10:
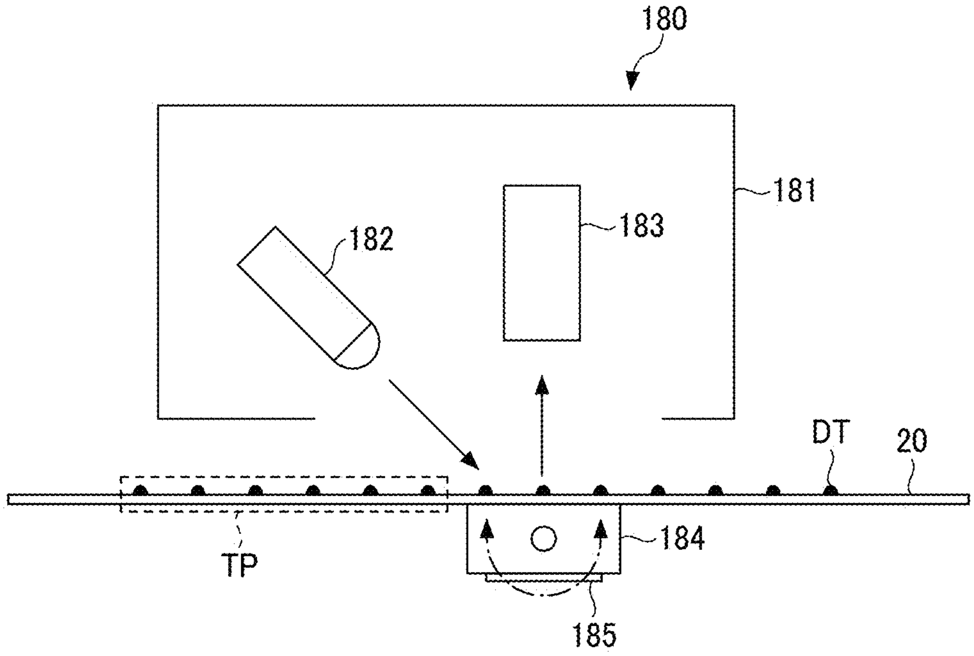
FIG. 10 is a schematic diagram illustrating a state where a pattern is read in an image recording apparatus according to one embodiment of the present invention.

FIG. 10 is a schematic diagram illustrating a state where a pattern is read in the image recording apparatus according to the present embodiment.

As illustrated in FIG. 10, the pattern reading unit 180 uses, for example, a reflective two-dimensional sensor including a light-emitting unit 182 and a light-receiving unit 183.

For example, the light-emitting unit 182 and the light-receiving unit 183 are arranged in a housing 181 arranged on the side of the recording medium 20 where dots DT are formed.

An opening portion is provided in the housing 181 on the side of the recording medium 20, and light emitted from the light-emitting unit 182 is reflected on the surface of the recording medium 20 and enters the light-receiving unit 183.

The light-receiving unit 183 forms an image by using the reflected light reflected from the surface of the recording medium 20.

The amount of reflected light used in the image formation varies between portions where an image (the dots DT of the test pattern TP) is formed and portions where no image is formed. Therefore, it is possible to detect the dot shape and the image density within the dots, based on the amount of reflected light detected by the light-receiving unit 183. The configuration and the detection method used in the pattern reading unit 180 can be modified in various ways, as long as it is possible to detect the test pattern TP formed as an image on the recording medium 20.

Further, the pattern reading unit 180 may include a reference pattern display unit 184 that includes a reference pattern 185 and is used as a device for calibrating the amount of light from the light-emitting unit 182 and the read voltage of the light-receiving unit 183.

For example, the reference pattern display unit 184 has a rectangular parallelepiped shape that is formed of a predetermined recording medium such as plain paper, and the reference pattern 185 is attached to one surface of the rectangular parallelepiped shape.

In the calibration of the light-emitting unit 182 and the light-receiving unit 183, the reference pattern display unit 184 rotates so that the reference pattern 185 faces the light-emitting unit 182 and the light-receiving unit 183. When calibration is not performed, the reference pattern display unit 184 inverts the reference pattern 185 so that the reference pattern 185 does not face the light-emitting unit 182 and the light-receiving unit 183.

Further, by reading the formed image and analyzing the image, the reaction conditions in the chemical surface treatment can be adjusted so that the dot diameter per applied ink amount takes a value of a target dot diameter, which improves the image quality. Further, the pigment density of the dots can be detected, based on the amount of reflected light, and thus, it is possible to acquire a dot image and measure the density within the dots.

The density values are statistically calculated to calculate the variance of the density variations, to measure the density unevenness. Further, by selecting the reaction conditions in the chemical surface treatment to minimize the calculated density unevenness, it is possible to prevent pigment opacity due to dot merging, and thus achieve even higher image quality.

A configuration may be used in which the user can switch between modes, depending on the targeted image quality, to select whether to prioritize control of the dot diameter, reduction of density unevenness, or improvement of the circularity.

As described above, the reaction conditions in the chemical surface treatment can be controlled in accordance with the color and the type of the ink to achieve a desired circularity of the dots or reduce the unevenness in the pigment within the dots, or to achieve a desired dot diameter. Thus, it is possible to form images of high quality while achieving uniform dot diameters and reducing energy consumption. Further, even if the type or the properties of the recording medium 20 are changed or the image formation speed is changed, it is possible to stably perform chemical surface treatment, and thus, it possible to stably achieve good image recording.

Figure 11:
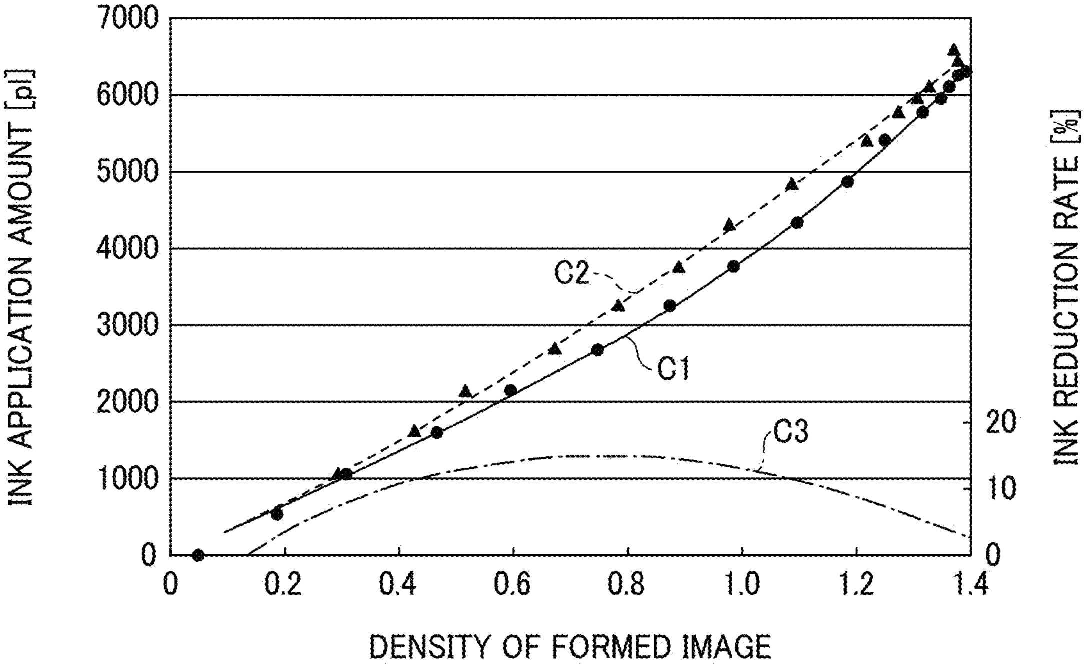
FIG. 11 is a graph illustrating a relationship between an ink application amount and the density of a formed image in an image recording apparatus according to one embodiment of the present invention.

FIG. 11 is a graph illustrating a relationship between an ink application amount and the density of a formed image in the image recording apparatus according to the present embodiment.

In FIG. 11, a solid line C1 indicates a relationship between the ink application amount and the density of the formed image, when an image is formed by an inkjet method on a recording medium that is subjected to a chemical surface treatment. A dashed line C2 indicates a relationship between the ink application amount and the density of the formed image, when an image is formed by an inkjet method on a recording medium that is not subjected to a chemical surface treatment. Further, a dashed and dotted line C3 indicates an ink reduction rate of the solid line C1 with respect to the dashed line C2.

As can be seen by comparing the solid line C1 and the dashed line C2 in FIG. 11, and from the dashed and dotted line C3, if the recording medium is subjected to a chemical surface treatment prior to image formation, the ink application amount desirable to obtain the same image density is reduced by effects such as improved circularity of the dots, enlargement of the dots, and uniform concentration of the pigment within the dots.

Further, by subjecting the recording medium to a chemical surface treatment prior to image formation, the thickness of the pigment applied to the recording medium is reduced, and thus, effects such as improved color saturation and a wider color gamut can be achieved.

As a result of reducing the amount of ink, the energy used for drying the ink can also be reduced, and thus, it is possible to reduce energy consumption.

Moreover, the image data of the image to be formed may be input from an external higher-level device, for example.

Figure 12:
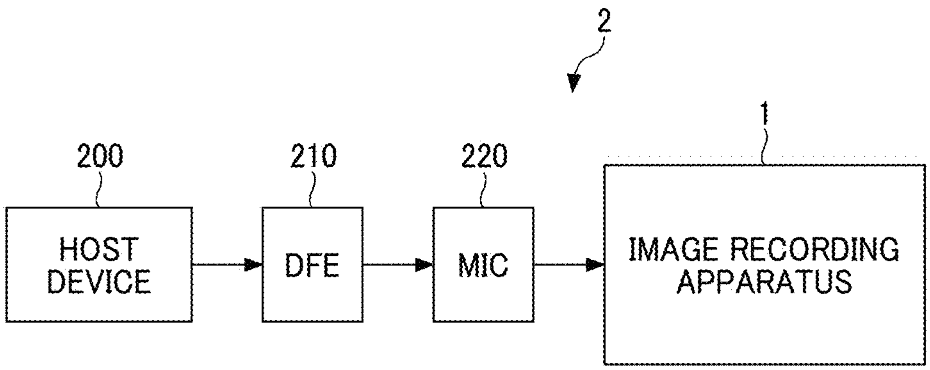
FIG. 12 is a schematic diagram illustrating an image recording system including an image recording apparatus according to one embodiment of the present invention.

FIG. 12 is a schematic diagram illustrating an image recording system including the image recording apparatus according to the present embodiment.

As illustrated in FIG. 12, an image recording system 2 includes, in addition to the image recording apparatus 1, a host device 200, a printer controller (Digital Front End (DFE)) (hereinafter referred to as DFE) 210, and an interface controller (Mechanism I/F Controller (MIC)) (hereinafter referred to as MIC) 220.

For example, the host device 200 creates image data for an image formation target, and outputs the image data to the DFE 210 as image data in a vector format.

The host device 200 may be, for example, a personal computer (PC). The DFE 210 communicates with the image recording apparatus 1 via the MIC 220, and controls the formation of images in the image recording apparatus 1.

For example, the DFE 210 may include a PC.

Further, the DFE 210 can be connected to a host device such as another PC.

The DFE 210 receives image data in a vector format from the host device 200 and performs language interpretation on the image data to convert the image data in the vector format into image data in a raster format.

In this case, the DFE 210 converts a color space expressed in an RGB format or the like into a color space in a CMYK format or the like.

The DFE 210 transmits the generated image data in the raster format to the image recording apparatus 1 via the MIC 220.

An example is described in which the DFE 210 includes a single PC. However, the DFE 210 is not limited thereto. For example, the DFE 210 may be incorporated into the host device 200, or may be mounted in the image recording apparatus 1 together with the MIC 220.

Further, if the image recording system 2 is a cloud computing system, the DFE 210 may be arranged in a computer in a network, may be arranged in-between the network and the image recording apparatus 1, or may be arranged in the image recording apparatus 1.

EXAMPLES

The present invention will be described in more detail below by with reference to specific examples, but the present invention is not limited to these examples.

In the following analysis and evaluation, cases where a recording medium after chemical surface treatment was used are referred to as Examples, and cases where a recording medium before chemical surface treatment was used are referred to as Comparative Examples.

(Recording Medium)

A PP film 1 (PYLEN film P1011, Toyobo Co., Ltd.), a PET film 1 (LUMIRROR #50-T60, manufactured by Toray Industries, Inc.), a polyvinyl chloride film 1 (IJ180, manufactured by 3M Japan Co., Ltd.), and a polyvinyl chloride film 2 (GIY-11Z5 GLOSS, manufactured by Lintec Sign System Inc.), which are poorly absorbent, were used as recording media.

(Chemical Surface Treatment of Recording Medium)

10 g of sodium chlorite (manufactured by KANTO CHEMICAL CO., INC.) and 500 mL of highly pure water were filled into a glass container. After dissolving the sodium chlorite in the highly pure water, 4.5 mL of an aqueous hydrochloric acid solution (manufactured by Kishida Chemical Co., Ltd.) having a concentration of 35-37% was added to prepare a mixed solution. The mixed solution was left to stand for 24 hours. After 24 hours, the UV spectrum of the mixed solution was measured by using a spectrophotometer (U-3900H, manufactured by Hitachi High-Tech Corporation) to confirm that absorption by chlorine dioxide can be observed in the vicinity of 350 to 360 nm.

A container was prepared that was sealed to block external air and included a glass irradiation window to allow light to enter the inside of the container. Each recording medium and the above-mentioned mixed solution that was filled into a beaker to serve as a chlorine dioxide gas source were placed in the container. The surface of the recording medium inside the container was irradiated from the outside of the container with ultraviolet light from a light source having a wavelength of 365 nm at 200 mW/cm$^2$ for 5 minutes via the irradiation window.

<Analysis of Infrared Absorption Spectrum of Surface of Recording Medium Before and After Chemical Surface Treatment>

After the chemical surface treatment, each recording medium was removed from the sealed container. The chemical composition of the surface of each recording medium was evaluated by analyzing an infrared absorption spectrum using a Fourier transform infrared spectrometer (FRONTIER, manufactured by PerkinElmer Inc.) under the measurement conditions mentioned below.

In the measurement, diamond crystals were used, and thus, information was obtained from the surface layer to a depth of 4 μm.

(Measurement Conditions)

Measurement mode: ATR (diamond)

Resolution: 4 cm$^{-1}$

Detector: TGS detector

Measurement wavelength region: 4000 to 650 cm$^{-1}$

Number of repetitions: 4

Figure 13:
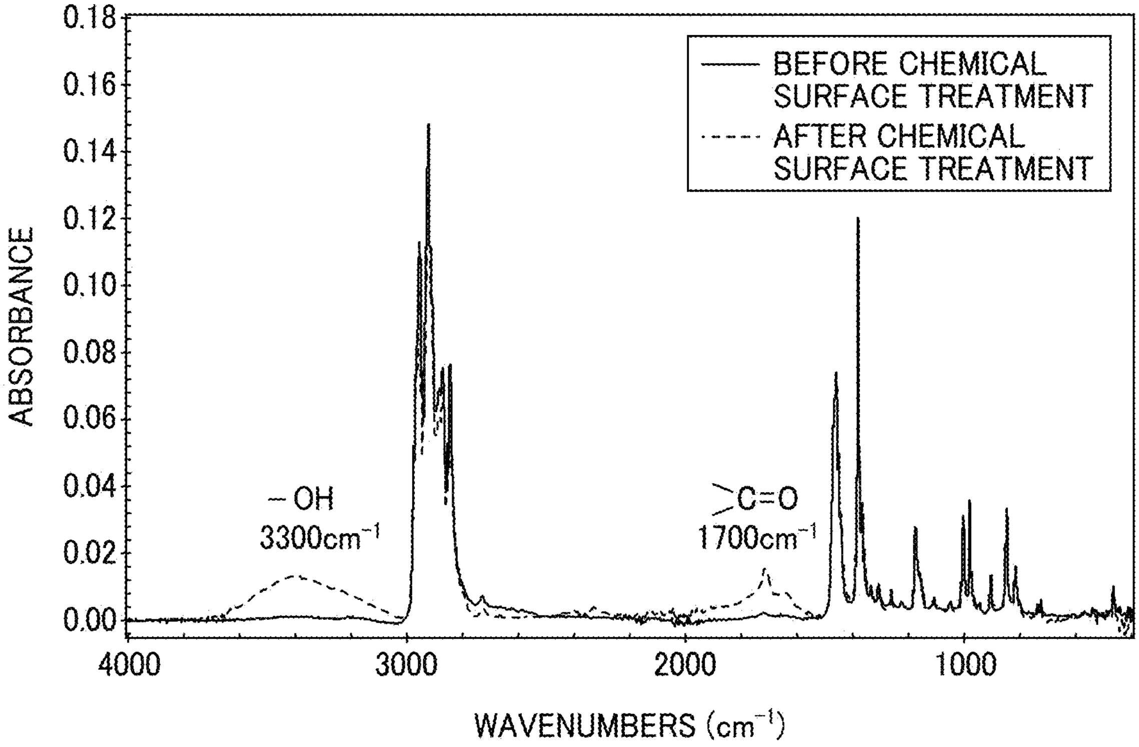
FIG. 13 is a graph illustrating a result of an analysis of an infrared absorption spectrum of a surface of a PP film 1 before and after performing chemical surface treatment.
Figure 14:
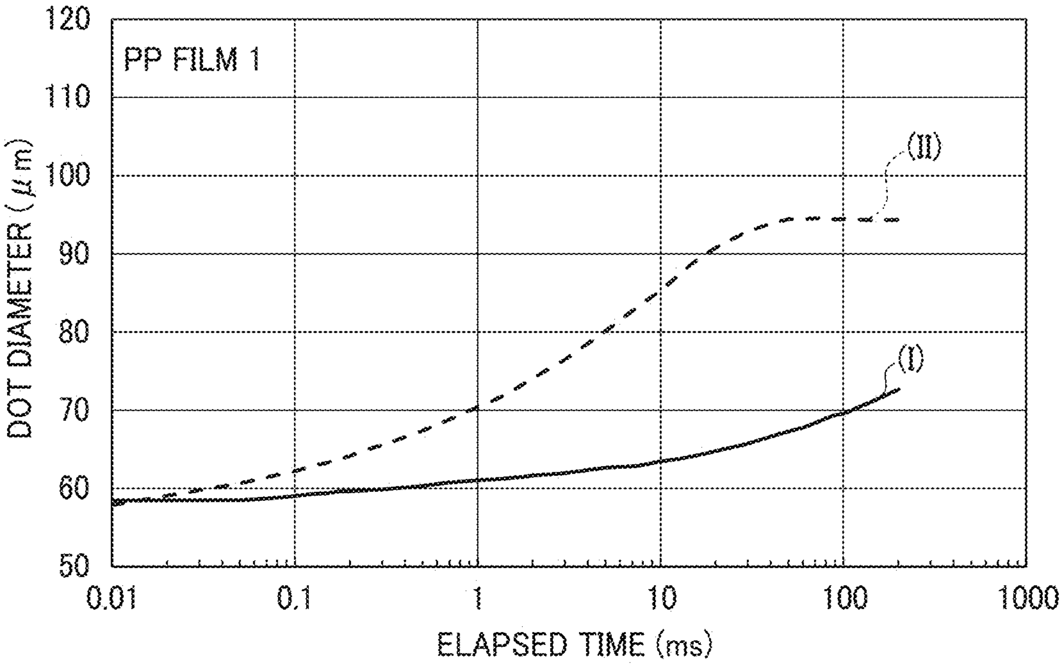
FIG. 14 is a graph illustrating a change over time of a dot diameter of ink droplets deposited on the surface of the PP film 1 before and after performing chemical surface treatment.
Figure 15:
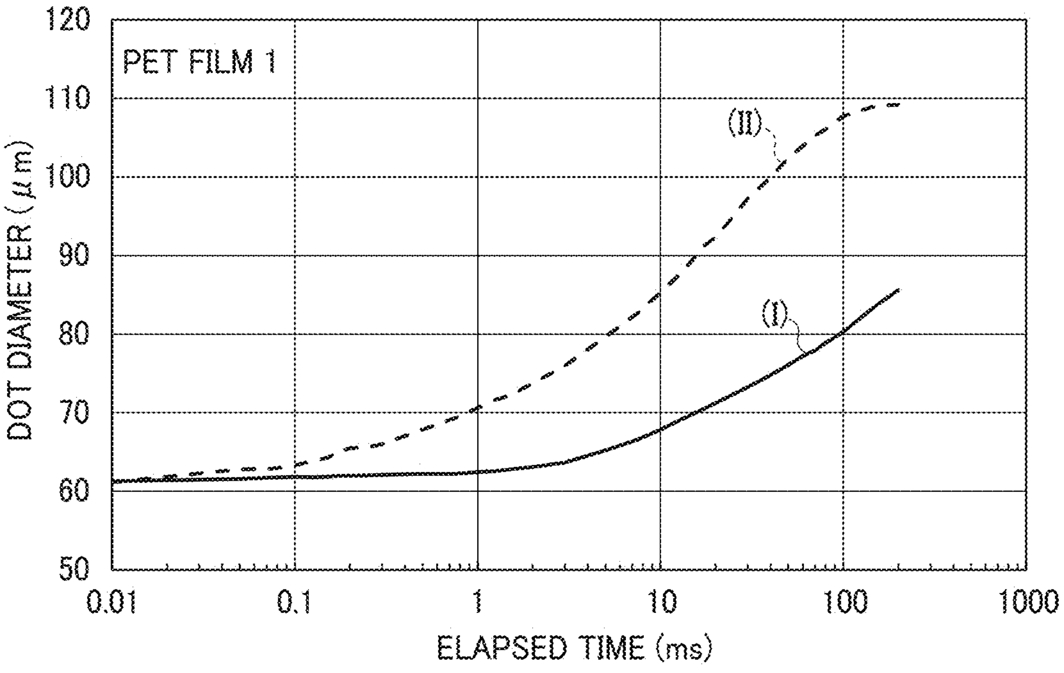
FIG. 15 is a graph illustrating a change over time of a dot diameter of ink droplets deposited on a surface of a PET film 1 before and after performing chemical surface treatment.
Figure 16:
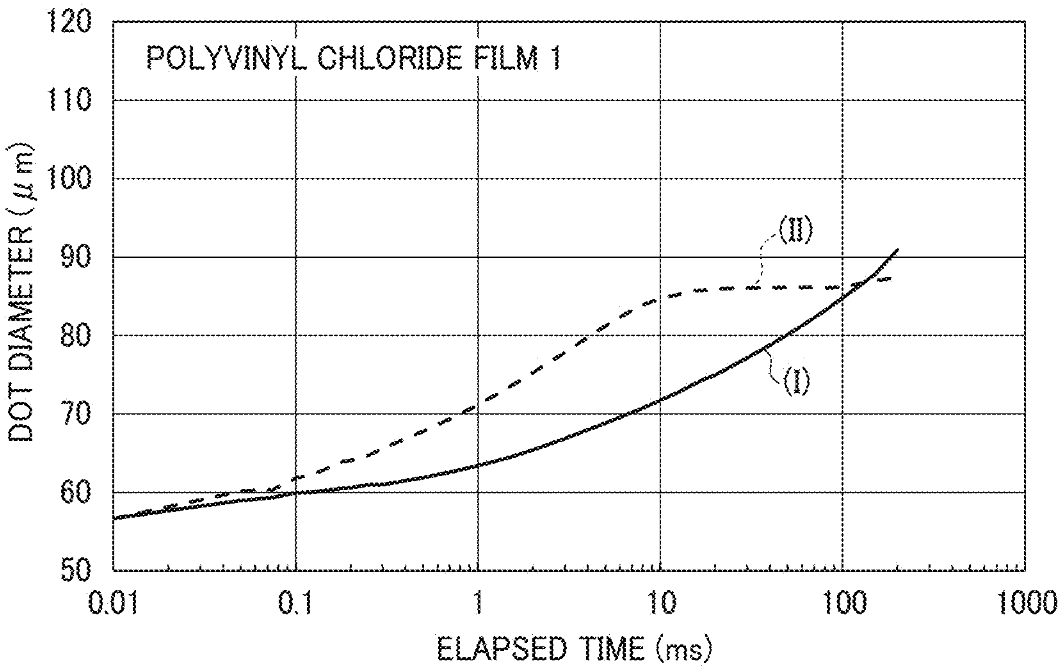
FIG. 16 is a graph illustrating a change over time of a dot diameter of ink droplets deposited on a surface of a polyvinyl chloride film 1 before and after performing chemical surface treatment.
Figure 17:
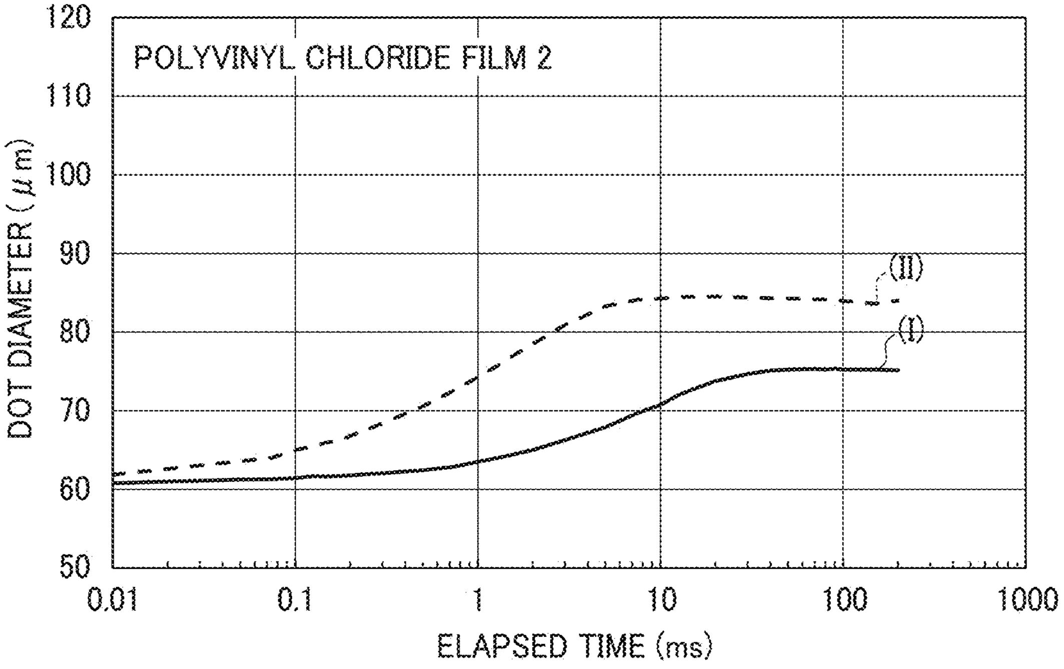
FIG. 17 is a graph illustrating a change over time of a dot diameter of ink droplets deposited on a surface of a polyvinyl chloride film 2 before and after performing chemical surface treatment.
Figure 18:
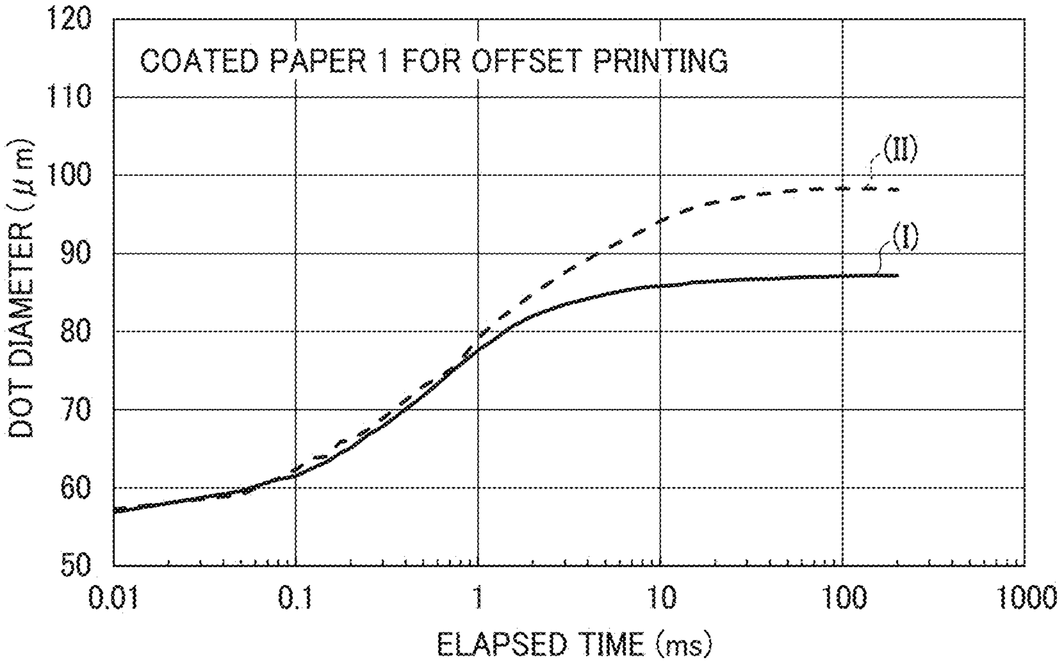
FIG. 18 is a graph illustrating a change over time of a dot diameter of ink droplets deposited on a surface of coated paper 1 for offset printing before and after performing chemical surface treatment.
Figure 19:
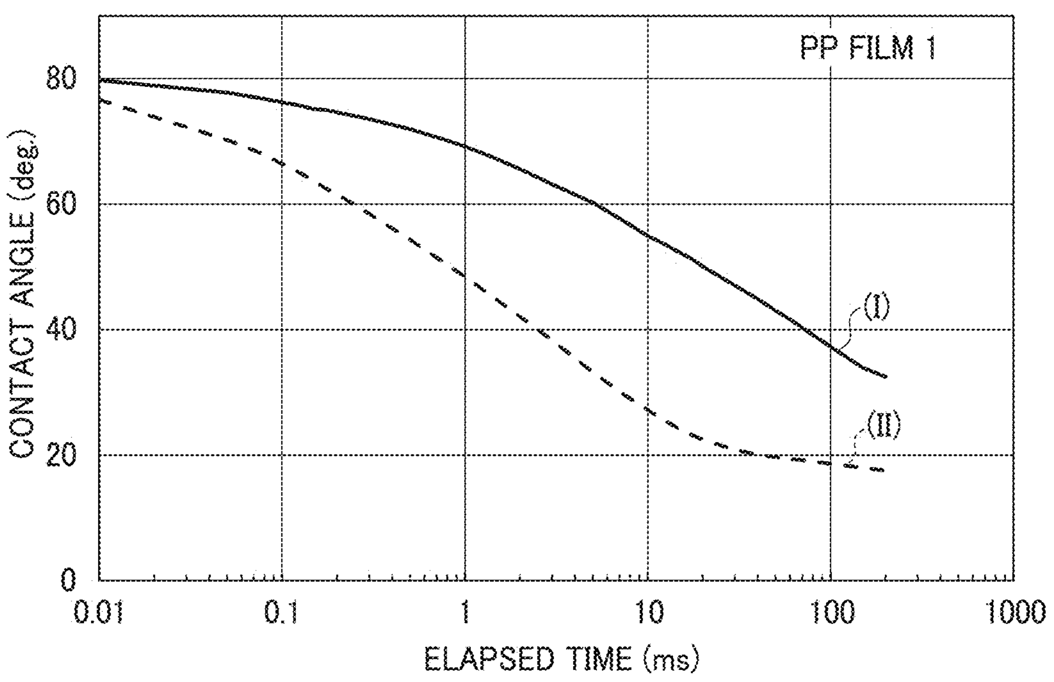
FIG. 19 is a graph illustrating a change over time of a contact angle of ink droplets deposited on the surface of the PP film 1 before and after performing chemical surface treatment.
Figure 20:
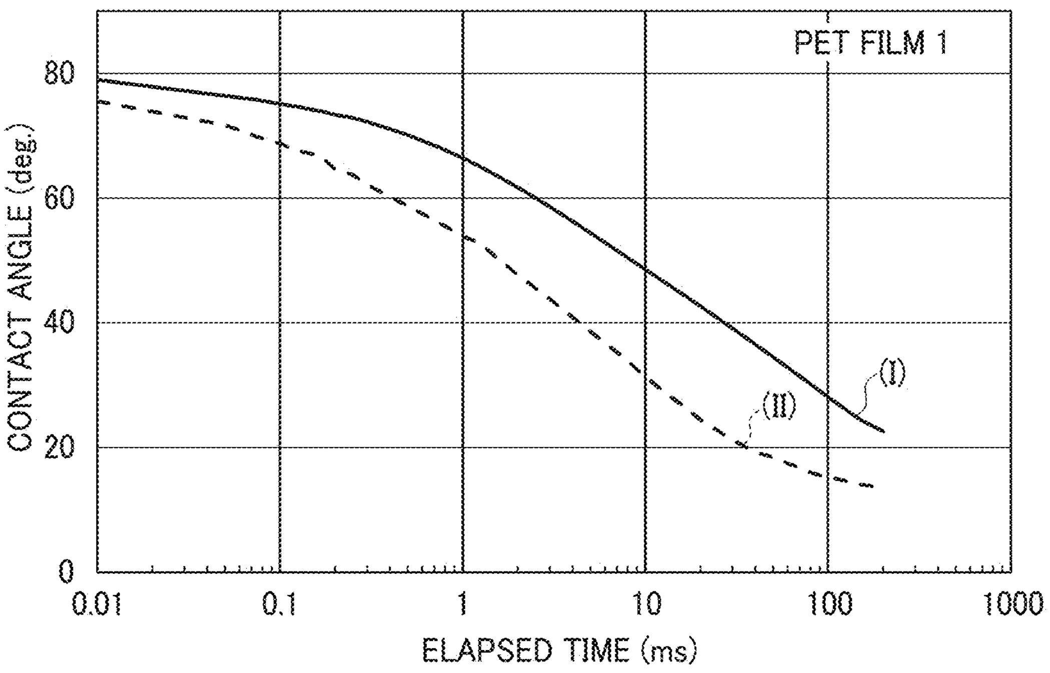
FIG. 20 is a graph illustrating a change over time of a contact angle of ink droplets deposited on the surface of the PET film 1 before and after performing chemical surface treatment.
Figure 21:
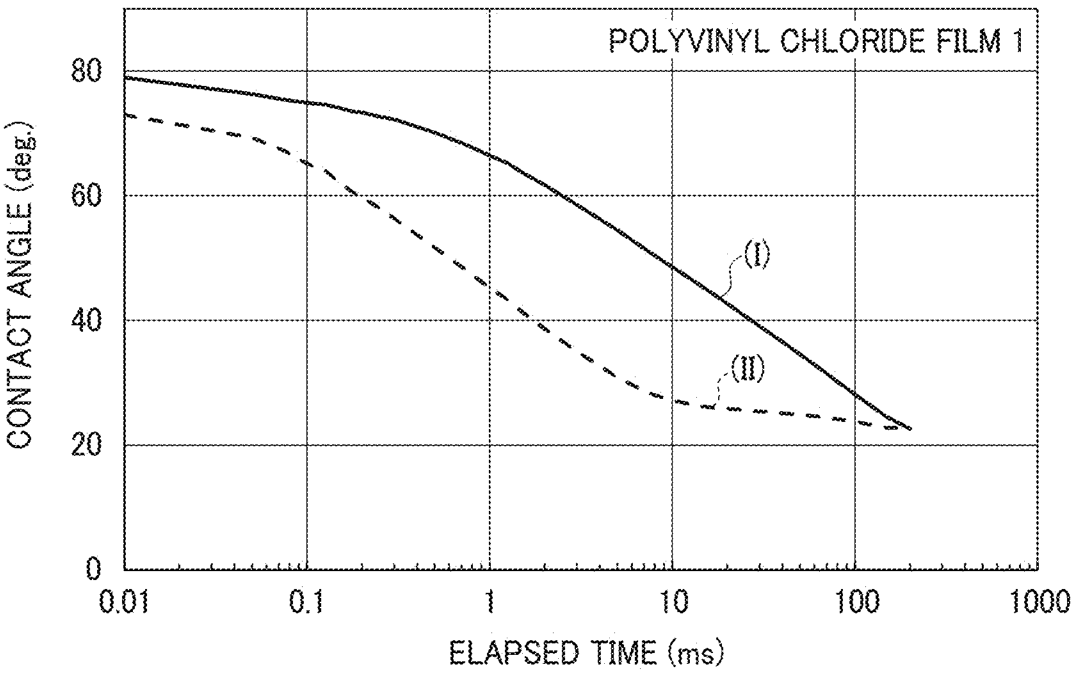
FIG. 21 is a graph illustrating a change over time of a contact angle of ink droplets deposited on the surface of the polyvinyl chloride film 1 before and after performing chemical surface treatment.
Figure 22:
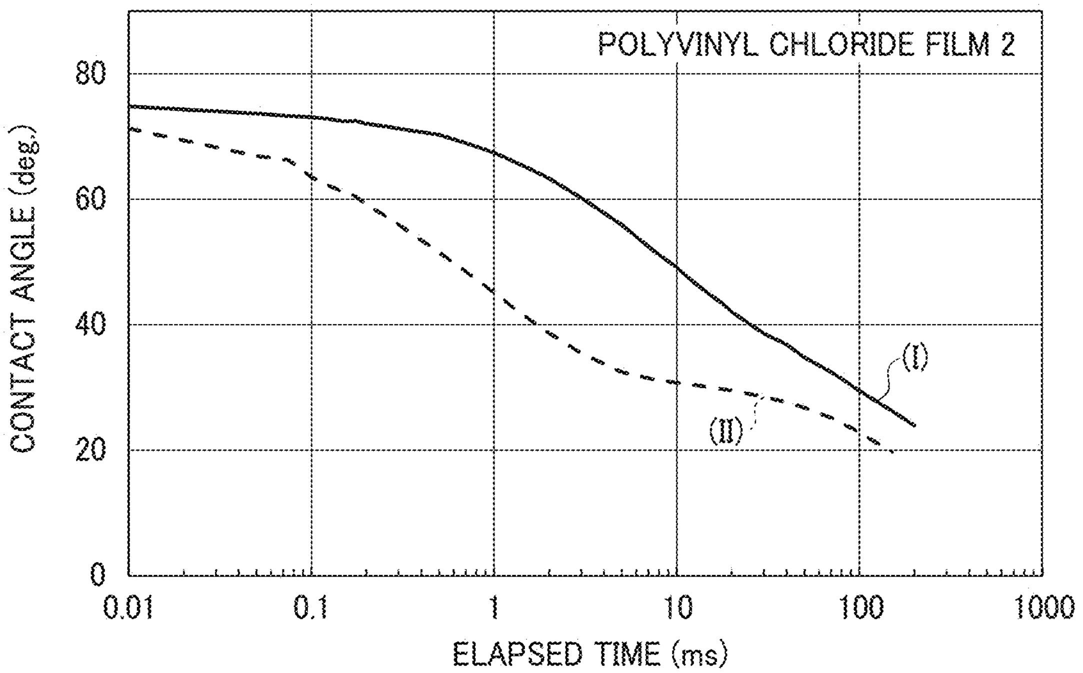
FIG. 22 is a graph illustrating a change over time of a contact angle of ink droplets deposited on the surface of the polyvinyl chloride film 2 before and after performing chemical surface treatment.
Figure 23:
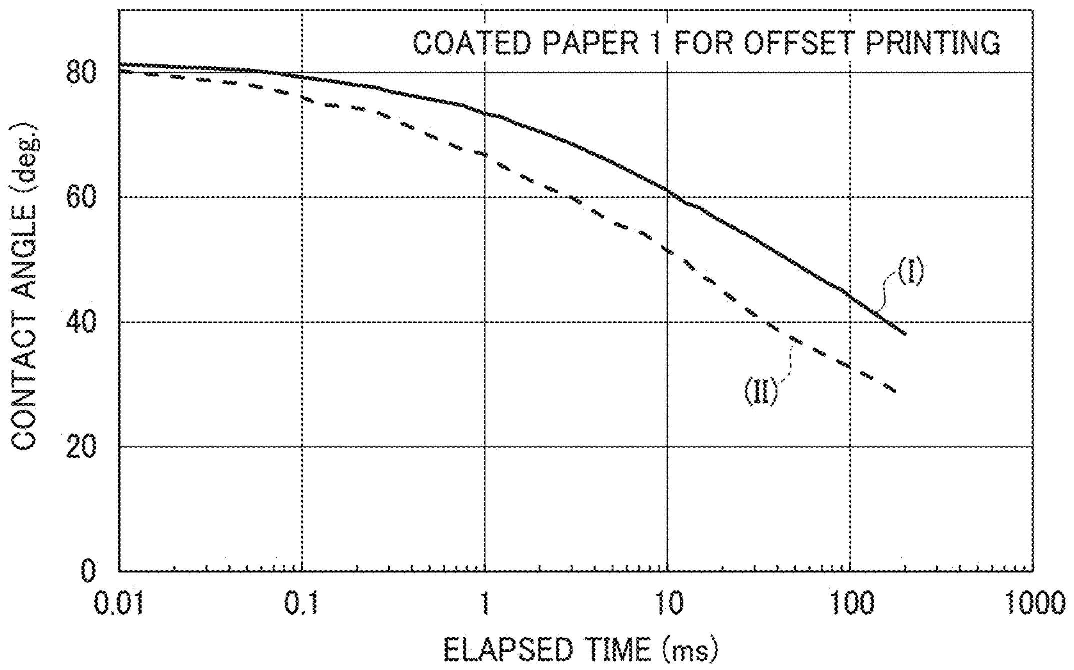
FIG. 23 is a graph illustrating a change over time of a contact angle of ink droplets deposited on the surface of the coated paper 1 for offset printing before and after performing chemical surface treatment.

As representative analysis results, FIG. 13 illustrates a graph illustrating results of an analysis of an infrared absorption spectrum of a surface of the PP film 1 before and after performing chemical surface treatment.

Comparing the infrared absorption spectra of the PP film 1 before and after the chemical surface treatment, the absorption at 1700 cm$^{-1}$ corresponding to the carbonyl group (—C(═O)—) contained in the ester group (—COOR), the carboxyl group (—COOH), and the like and the absorption at 3300 cm$^{-1}$ corresponding to the alcohol-based hydroxyl group (C—OH) relatively increased in the PP film 1 after the chemical surface treatment compared to that in the PP film 1 before the chemical surface treatment.

The chemical composition of the surfaces of the PET film 1, the polyvinyl chloride film 1, and the polyvinyl chloride film 2 were analyzed and the analysis results were similar to that of the PP film 1.

From the results, it was confirmed that the C—H bonds contained in the alkyl groups and the like on the surface of the recording medium were oxidized to carboxyl groups (—COOH), and the hydrophilic functional groups on the surface of the recording medium increased.

<X-Ray Photoelectron Spectroscopy Analysis of Surface of Recording Medium Before and After Chemical Surface Treatment>

Each recording medium subjected to chemical surface treatment was removed from the sealed container, and the chemical composition of the surface of each recording medium was examined by X-ray photoelectron spectroscopy (XPS) using an X-ray photoelectron spectrometer (K-Alpha, manufactured by Thermo Fisher Scientific Inc.) under the measurement conditions mentioned below to analyze the elemental concentration on the surface of the recording medium.

Each recording medium before and after the chemical surface treatment was cut into 10 mm squares to prepare samples. A double-sided carbon tape was attached to a surface of the sample opposite to the surface subjected to the chemical surface treatment, and each of the samples was attached and fixed to a sample stage.

(Measurement Conditions)

X-rays: Aluminum monochrome 12 kV*6 mA

Analysis area: 400 μmφ

Neutralization gun: ON

Pass energy: 50 eV

Energy step: 0.2 eV

The peaks of the measured XPS spectrum were identified by using the analytical software CasaXPS.

The element from which each XPS peak originated was identified by using an element library provided by Thermo Fisher Scientific Inc.

The elemental concentrations were calculated from the measured XPS spectra using the analytical software CasaXPS. The elements used to calculate the elemental concentrations were C 1s, N 1s, O 1s, and Cl 2p.

The background baseline for each element was generated by the Tougaard method. The horizontal adjacent average in the baseline generation was calculated using the average value of any three points in the energy range (horizontal axis) at the start point and the end point of the XPS spectrum data obtained from one measurement point of each of the above-described samples of the recording media.

The relative sensitivity factors RSF in the element library provided by Thermo Fisher Scientific Inc. were used to calculate the elemental concentrations. Average values of the elemental concentrations of C, N, O, and Cl were calculated for each sample from the elemental concentrations measured at any three points in a region sufficiently separated from a region already used in the XPS measurement.

The analysis result of the PP film 1 is illustrated as a representative analysis result in Table 1. In the surfaces of all recording media, an increase in the elemental concentration of oxygen was confirmed from O 1s before and after the chemical surface treatment, which confirms that the surface of the recording medium was oxidized. Further, also in the PET film 1, the polyvinyl chloride film 1, and the polyvinyl chloride film 2, similarly to the PP film 1, an increase in the elemental concentration of oxygen was confirmed from O 1s before and after the chemical surface treatment, which confirms that the surface of the recording medium was oxidized.

TABLE 1

| | PP Film 1 | |
|---|---|---|
| atom % | Before chemical surface treatment | After chemical surface treatment |
| C 1s | 99.0 | 74.2 |
| N 1s | 0.0 | 1.3 |
| O 1s | 1.0 | 18.5 |
| Cl 2p | 0.0 | 6.0 |

<Evaluation of Deposition Behavior of Ink Droplets on Surface of Recording Medium Before and After Chemical Surface Treatment>

The PP film 1, the PET film 1, the polyvinyl chloride film 1, the polyvinyl chloride film 2, and coated paper 1 for offset printing (OK TOP COAT GLOSS+127.9 gsm, manufactured by Oji Paper Co., Ltd.) were used as the recording media. An inkjet method was used in the recording medium image forming material applying device, and water-based pigment ink (cyan ink for RICOH Pro L5160e, manufactured by Ricoh Co., Ltd.) and water-based pigment ink (cyan ink for RICOH Pro VC70000, manufactured by Ricoh Co., Ltd.) were used as the image forming material. The effects of the above-described chemical surface treatment were evaluated by comparing the deposition behavior of ink droplets on the surfaces before and after the chemical surface treatment.

A water-based pigment ink (cyan ink for RICOH Pro L5160e, Ricoh Co., Ltd.) was used for the PP film 1, the PET film 1, the polyvinyl chloride film 1, and the polyvinyl chloride film 2, and a water-based pigment ink (cyan ink for RICOH Pro VC70000, Ricoh Co., Ltd.) was used for the coated paper 1 for offset printing.

The deposition behavior of ink droplets was observed and evaluated by using a deposition behavior visualization device (an experimental device described in Measurement of Viscosity Increasing Process of Ink Droplets after Landing on Media (Journal of The Imaging Society of Japan, Vol. 59, No. 5, Harada)).

In the deposition behavior visualization device, ink droplets are ejected toward the recording medium, while the inkjet head performs scanning, and a camera at high speed and high magnification is used to capture and record an image of a state where ink droplets are applied one after another to the recording medium. Further, the recorded moving image may be analyzed by using image processing to quantify the changes in the shape and the state of the ink droplets over time.

In each recording medium, dots were evaluated after a volume of 40 pL per droplet was deposited.

For ink droplets that entered the field of view of the image-capturing optical system, moving images were recorded at an image capturing speed of 20000 frames per second (fps) from just before the deposition of the first ink droplet to one second or more after the deposition of the last ink droplet. In the moving images captured of the ink droplets, the changes over time in the dot diameter and the contact angle of the ink droplet after application of the ink droplet to the recording medium were calculated by using image processing. The ink discharge cycle for applying ink was set to 160 Hz, the scanning speed of the actuator was set to 20 mm/s, and the interval between the deposited ink droplets was set to 125 μm.

FIGS. 14 to 18 are graphs illustrating the change over time of the dot diameter of ink droplets deposited on the surface of each recording medium before and after performing chemical surface treatment.

In FIGS. 14 to 18, the horizontal axis indicates the time elapsed after the ink droplets deposit on the recording medium, the vertical axis indicates the dot diameter of the ink droplets, and each graph indicates average values from 10 repetitions. From each graph, the behavior of wet-spreading on each recording medium depending on whether the surface is subjected to chemical surface treatment can be seen.

In FIGS. 14 to 18, the results before the chemical surface treatment are illustrated as (I), and the results after the chemical surface treatment are illustrated as (II).

FIGS. 19 to 23 are graphs illustrating the change over time of the contact angle of ink droplets deposited on the surface of each recording medium before and after performing chemical surface treatment.

In FIGS. 19 to 23, the horizontal axis indicates the time elapsed after the ink droplets deposit on the recording medium, the vertical axis indicates the contact angle of the ink droplets, and each graph indicates average values from 10 repetitions. From each graph, the behavior of wet-spreading on each recording medium depending on whether the surface is subjected to chemical surface treatment can be seen.

In FIGS. 19 to 23, the results before the chemical surface treatment are illustrated as (I), and the results after the chemical surface treatment are illustrated as (II).

As the dot area increases, the surface area in which the ink contacts the outside air increases. Thus, the evaporation of the ink solvent is promoted and the ink dries more easily. Therefore, if the ink droplets spread more rapidly, the ink dries more easily and is fixed more easily to the recording medium. Thus, dots are prevented from merging and the ink is prevented from flowing into adjacent dots. Therefore, it is possible to prevent the beading phenomenon and the bleeding phenomenon.

From FIGS. 14 to 18, it can be understood that, in all of the above-mentioned recording media, the dot diameter of the ink droplets in the recording media after the chemical surface treatment expanded in a shorter time than in the recording media before the chemical surface treatment, and expanded quickly in the initial stage until 50 msec after deposition.

Further, from FIGS. 19 to 23, it can be understood that, in all of the above-mentioned recording media, the contact angle of the ink droplets in the recording media after the chemical surface treatment decreased in a shorter time than in the recording media before the chemical surface treatment, and the ink droplets spread more rapidly after deposition.

From the above, it can be understood that, in the above-mentioned recording media after the chemical surface treatment, it is possible to suppress the beading phenomenon and the bleeding phenomenon.

Figure 24A:
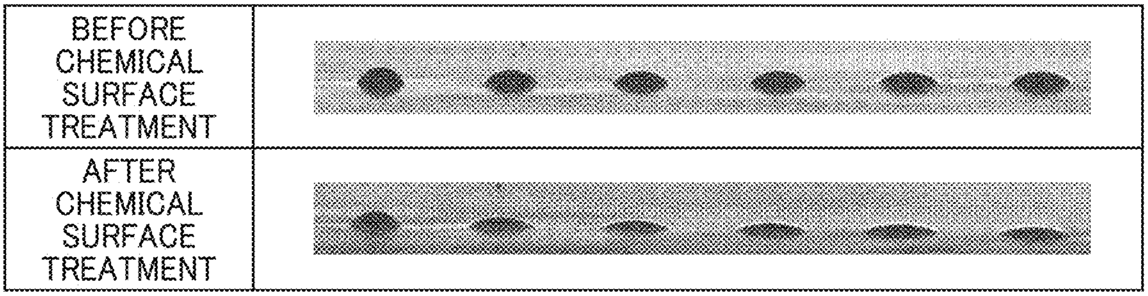
FIGS. 24A and 24B are captured images illustrating a deposition behavior of ink droplets deposited on the surface of the polyvinyl chloride films 1 and 2, respectively, before and after performing chemical surface treatment.
Figure 24B:
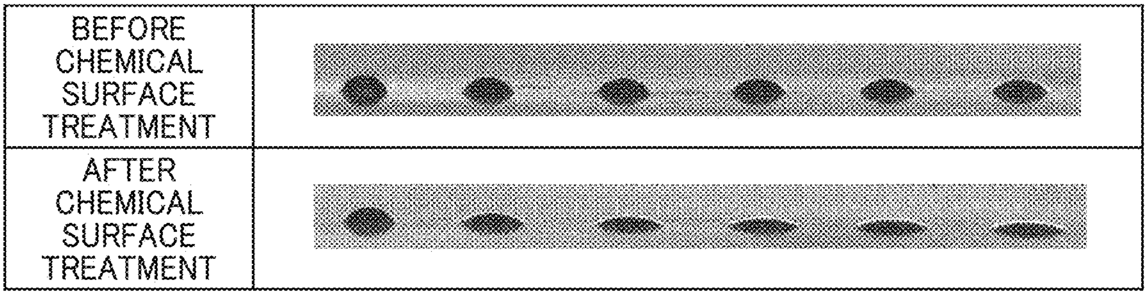

FIGS. 24A and 24B are captured images illustrating a deposition behavior of ink droplets deposited on the surface of the polyvinyl chloride films 1 and 2 before and after the chemical surface treatment. The images were captured by causing ink droplets to deposit on a polyvinyl chloride film from right to left and using a camera to capture an image. The image was captured so that the right side illustrates a longer elapsed time after deposition and the left side illustrates a shorter elapsed time.

FIGS. 24A and 24B illustrate a change in dot diameter when ink droplets deposit on the polyvinyl chloride films 1 and 2. FIG. 24A illustrates images captured of the polyvinyl chloride film 1, and FIG. 24B illustrates images captured of the polyvinyl chloride film 2.

It can be seen from the images that, in the polyvinyl chloride films 1 and 2, the dot diameter is larger and the contact angle between the polyvinyl chloride film and the ink is smaller in the polyvinyl chloride films 1 and 2 after the chemical surface treatment than in the polyvinyl chloride films 1 and 2 before the chemical surface treatment. This indicates that, by performing the above-described chemical surface treatment, the ink droplets spread more rapidly, and the wet-spreading of the ink droplets increases.

Further, the behavior of the ink when deposited on the polyvinyl chloride films 1 and 2 heated to 50° C. was examined by measuring the dot diameter of the ink droplets similarly as described above.

Figure 25:
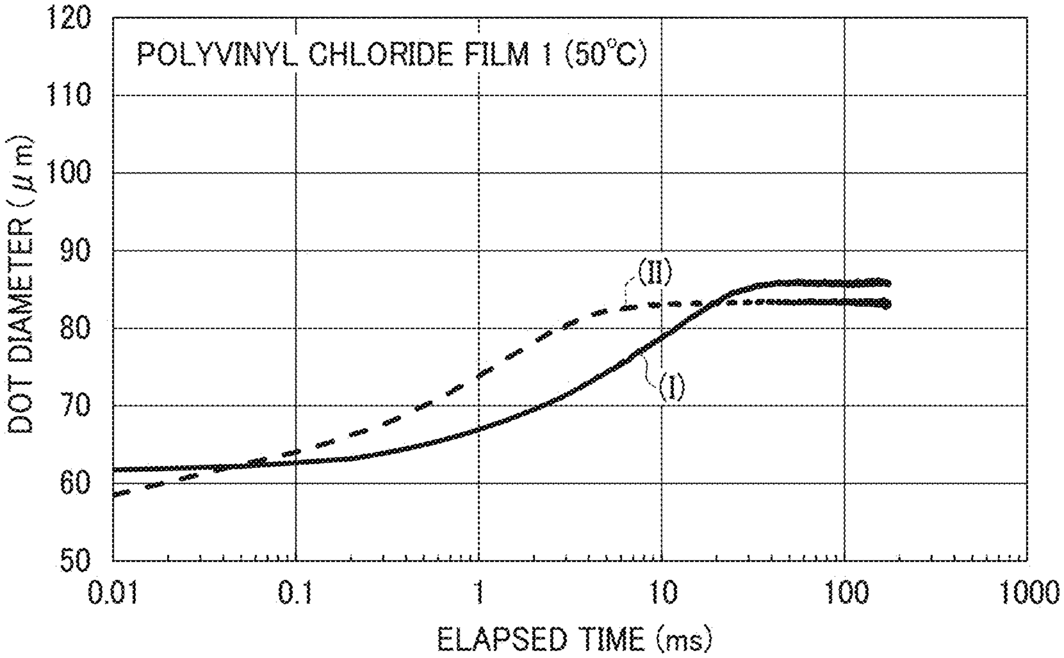
FIG. 25 is a graph illustrating a change over time of a dot diameter of ink droplets deposited on the surface of the polyvinyl chloride film 1 at 50° C. before and after performing chemical surface treatment.

FIG. 25 is a graph illustrating a change over time of the dot diameter of ink droplets deposited on the surface of the polyvinyl chloride film 1 at 50° C. before and after performing chemical surface treatment.

Figure 26:
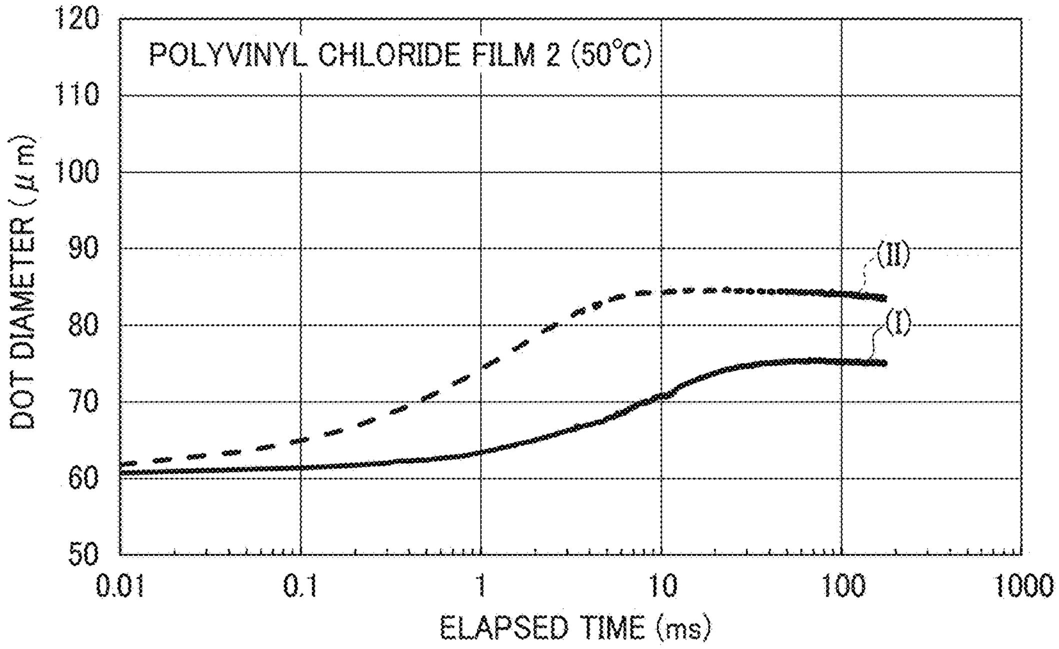
FIG. 26 is a graph illustrating a change over time of a dot diameter of ink droplets deposited on the surface of the polyvinyl chloride film 2 at 50° C. before and after performing chemical surface treatment.

FIG. 26 is a graph illustrating a change over time of the dot diameter of ink droplets deposited on the surface of the polyvinyl chloride film 2 at 50° C. before and after performing the chemical surface treatment.

In FIGS. 25 and 26, the results before the chemical surface treatment are illustrated as (I), and the results after the chemical surface treatment are illustrated as (II).

In the polyvinyl chloride films 1 and 2 before and after the chemical surface treatment, which were heated to 50° C., the dot diameter expanded more rapidly in the polyvinyl chloride films 1 and 2 after the chemical surface treatment than in the polyvinyl chloride films 1 and 2 before the chemical surface treatment.

Moreover, in the polyvinyl chloride films 1 and 2 after the chemical surface treatment, the dots finish expanding within 10 msec.

Therefore, it is understood that the wettability of the recording medium subjected to chemical surface treatment improved, regardless of the temperature.

From the above-mentioned results, it is understood that, by modifying the surface of a recording medium using chlorine dioxide and light, the wettability can be improved, regardless of the type of recording medium.

<Comparison of Images Formed on Recording Medium Before and After Chemical Surface Treatment>

Next, polyvinyl chloride films 2 before and after the chemical surface treatment were prepared, and an image was formed by using an inkjet printer.

The chemical surface treatment of the polyvinyl chloride film 2 was performed similarly as described above.

The exterior casing of an inkjet printer (IPSiO GX-e5500, Ricoh Co., Ltd.) performing serial printing by moving the head relative to the recording medium, was removed. A rear multi-manual feeder was attached, and the ink supply path including the head was washed by passing pure water. The cleaning liquid was passed through sufficiently until the cleaning liquid was no longer colored, and then, the cleaning liquid was completely drained from the device. The printer after cleaning was used as an image recording apparatus for evaluation.

Further, as image forming materials, black, cyan, magenta, and yellow inks (for RICOH Pro L5160e, Ricoh Co., Ltd.) were degassed by stirring for 30 minutes under reduced pressure conditions of 5 to 10 Pa to prepare evaluation inks.

The obtained inks were filled into an ink cartridge (for IPSiO GX-e5500, Ricoh Co., Ltd.) to prepare an ink cartridge for evaluation.

The ink cartridge for evaluation was set in the above-described image recording apparatus for evaluation, and the nozzles were filled with each evaluation ink. It was confirmed that all nozzles were filled with the evaluation ink and that no abnormal images were produced. After selecting the glossy paper high quality mode in the driver attached to the printer, the user settings were set to color matching off as the printing mode. In this mode, the ink application amount was adjusted by changing the drive voltage of the head so that the ink application amount to the recording medium for a solid image was 20 $g/m^2$.

In the polyvinyl chloride film 2 before and after the chemical surface treatment, a double-sided tape was attached to the surface opposite to the surface subjected to chemical surface treatment. The polyvinyl chloride film 2 was fixed onto plain PPC paper (MY PAPER, Ricoh Co., Ltd.) with double-sided tape, and a test image 1 created by using MICROSOFT OFFICE 365 WORD was formed on the polyvinyl chloride film 2.

Figure 27:
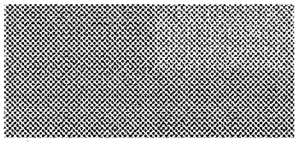
FIG. 27 are pictures of images formed on the surface of the polyvinyl chloride film 2 before and after performing chemical surface treatment.
Figure 27:
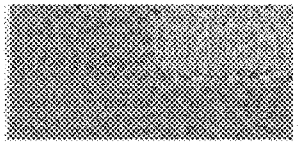

FIG. 27 illustrates pictures of images formed on the surface of the polyvinyl chloride film 2 before and after the chemical surface treatment. The upper part of FIG. 27 illustrates enlarged images of the test image 1 obtained by image forming.

In the test image 1 before the chemical surface treatment, dots merged, so that spots were generated in solid areas and light and dark shading was observed. However, in the test image 1 after the chemical surface treatment, the wettability on the recording medium was improved, so that the merging of dots was suppressed and a uniform image without light and dark shading was obtained.

Further, in the test image 1 before the chemical surface treatment, inter-color bleeding occurred at a large extent, so that areas of mixed colors were created. However, in the test image 1 after the chemical surface treatment, dots were prevented from merging, so that dot merging between colors was suppressed, and thus, color boundary bleeding was reduced.

Moreover, similarly as described above, a test image 2 was formed as an image including white characters of 6 point on a black background. The lower part of FIG. 27 illustrates enlarged images of the test image 2 obtained by image forming.

In the test image 2 before the chemical surface treatment, the white characters were blurred due to uneven wetting, resulting in poor legibility. However, in the test image 2 after the chemical surface treatment, wetting was uniform, so that the white characters were not blurred, resulting in excellent legibility.

The above-mentioned results indicate that, according to an image recording apparatus that can modify the surface of a recording medium by using chlorine dioxide and light, it is possible to form good images, regardless of the type of recording medium.

Aspects of the present invention are, for examples, as follows.

According to a first aspect, an image recording apparatus includes a recording medium chemical surface treatment device including a chlorine dioxide supplying unit that supplies chlorine dioxide to a recording medium and a light irradiating unit that emits light to the recording medium, and an image forming material applying device that applies an image forming material to the recording medium subjected to chemical surface treatment by the recording medium chemical surface treatment device.

According to a second aspect, in the image recording apparatus according to the first aspect, the image forming material applying device employs an inkjet method.

According to a third aspect, in the image recording apparatus according to the first or second aspect, the image forming material includes a water-based ink.

According to a fourth aspect, in the image recording apparatus according to any one of the first, second, and third aspects, the recording medium chemical surface treatment device includes a shielding mechanism to block external air.

According to a fifth aspect, in the image recording apparatus according to any one of the first, second, third, and fourth aspects, the recording medium chemical surface treatment device includes an exhaust mechanism.

According to a sixth aspect, in the image recording apparatus according to the fifth aspect, the exhaust mechanism includes a chlorine dioxide-derived compound adsorption mechanism to adsorb a compound derived from chlorine dioxide.

According to a seventh aspect, in the image recording apparatus according to any one of the first, second, third, fourth, fifth, and sixth aspects, the chlorine dioxide supplying unit supplies a gas containing the chlorine dioxide.

According to an eighth aspect, the image recording apparatus according to any one of the first, second, third, fourth, fifth, sixth, and seventh aspects further includes the recording medium, and a surface of the recording medium onto which the image forming material is applied has poor liquid absorption.

According to the image recording apparatus according to any one of the first to eighth aspects described above, it is possible to solve the above-described conventional problems and achieve the object of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image recording apparatus comprising:

a recording medium chemical surface treatment device including:

a chlorine dioxide supplying unit that supplies chlorine dioxide to a recording medium; and a light irradiating unit that emits light to the recording medium; and an image forming material applying device that applies an image forming material to the recording medium subjected to chemical surface treatment by the recording medium chemical surface treatment device.

2. The image recording apparatus according to claim 1, wherein the image forming material applying device employs an inkjet method.

3. The image recording apparatus according to claim 2, wherein the recording medium chemical surface treatment device includes a shielding mechanism to block external air.

4. The image recording apparatus according to claim 1, wherein the image forming material includes a water-based ink.

5. The image recording apparatus according to claim 1, wherein the recording medium chemical surface treatment device includes an exhaust mechanism.

6. The image recording apparatus according to claim 5, wherein the exhaust mechanism includes a chlorine dioxide-derived compound adsorption mechanism to adsorb a compound derived from chlorine dioxide.

7. The image recording apparatus according to claim 1, wherein the chlorine dioxide supplying unit supplies a gas containing the chlorine dioxide.

8. The image recording apparatus according to claim 1, further comprising the recording medium, wherein a surface of the recording medium onto which the image forming material is applied has poor liquid absorption.

* * * * *